United States Patent
Ashelin et al.

(10) Patent No.: US 9,969,576 B1
(45) Date of Patent: May 15, 2018

(54) INFLATABLE WEATHER BARRIERS FOR LOADING DOCKS

(71) Applicants: Charles J. Ashelin, Dubuque, IA (US); Collin Thole, Lancaster, WI (US); Frank Heim, Platteville, WI (US); Timothy J. Schmidt, Dubuque, IA (US)

(72) Inventors: Charles J. Ashelin, Dubuque, IA (US); Collin Thole, Lancaster, WI (US); Frank Heim, Platteville, WI (US); Timothy J. Schmidt, Dubuque, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days. days.

(21) Appl. No.: 15/439,587

(22) Filed: Feb. 22, 2017

(51) Int. Cl.
*E04B 1/34* (2006.01)
*B65G 69/00* (2006.01)

(52) U.S. Cl.
CPC .................................. *B65G 69/008* (2013.01)

(58) Field of Classification Search
CPC ......... B65G 69/008; E06B 3/80; E06B 3/805; E04H 14/00
USPC ....... 52/173.2, 2.12, 2.22, 2.13, 173.1, 2.16, 52/2.25, 2.24
See application file for complete search history.

(56) References Cited

U.S. PATENT DOCUMENTS

| | | |
|---|---|---|
| 3,303,615 A | 2/1967 | O'Neal |
| 3,391,502 A | 7/1968 | O'Neal |
| 3,714,715 A | 2/1973 | Coes, Jr. |

(Continued)

FOREIGN PATENT DOCUMENTS

| | | |
|---|---|---|
| GB | 0600117 | 6/1978 |
| GB | 0069093 | 1/1983 |

(Continued)

OTHER PUBLICATIONS

Super Seal Mfg. Ltd., "Super Seal Dock Seals", Aug. 23, 1989, 8 pages.
Hafa, "Torabdichtungen," Jun. 2001, 15 pages.

*Primary Examiner* — Chi Q Nguyen
(74) *Attorney, Agent, or Firm* — Hanley, Flight & Zimmerman, LLC

(57) ABSTRACT

Inflatable weather barriers for loading docks are disclosed. An example weather barrier includes an upper bellows defining a header air chamber between a top portion and a bottom portion of the upper bellows. A blower is in fluid communication with the header air chamber and the blower is selectively activated to discharge a pressurized air into the header air chamber to urge the upper bellows from a raised position toward a lowered position. The weather barrier includes a first extension spring that is under a first extension spring tension, a first pulley, and a first elongate member that is pliable. The first elongate member is under a first elongate member tension that urges the upper bellows toward the raised position. The first elongate member is wrapped at least partially around the first pulley and the first extension spring being connected to the first pulley such that the first pulley transmits the first extension spring tension to the first elongate member to subject the first elongate member to the first elongate member tension.

22 Claims, 17 Drawing Sheets

(56) References Cited

U.S. PATENT DOCUMENTS

| | | | |
|---|---|---|---|
| 3,809,144 A | 5/1974 | Garufo | |
| 3,816,867 A | 6/1974 | Shirzad | |
| 3,939,614 A | 2/1976 | Frommelt et al. | |
| 3,994,103 A | 11/1976 | Ouellet | |
| 4,020,607 A | 5/1977 | Bjervig | |
| 4,044,510 A | 8/1977 | O'Neal | |
| 4,045,925 A | 9/1977 | O'Neal | |
| 4,238,910 A | 12/1980 | O'Neal | |
| 4,262,458 A | 4/1981 | O'Neal | |
| 4,322,923 A | 4/1982 | O'Neal | |
| 4,389,821 A | 6/1983 | O'Neal | |
| 4,750,299 A | 6/1988 | Frommelt et al. | |
| 4,821,468 A | 4/1989 | Moore | |
| 4,916,870 A | 4/1990 | Moore | |
| 5,007,211 A | 4/1991 | Ouellet | |
| 5,109,639 A | 5/1992 | Moore | |
| 5,553,424 A | 9/1996 | Brockman et al. | |
| 5,564,238 A * | 10/1996 | Ellis | B65G 69/008 49/447 |
| 5,775,044 A * | 7/1998 | Styba | B65G 69/008 160/40 |
| 6,205,721 B1 | 3/2001 | Ashelin et al. | |
| 6,233,885 B1 | 5/2001 | Hoffmann et al. | |
| 6,425,214 B1 * | 7/2002 | Boffeli | B65G 69/008 52/173.2 |
| 7,185,463 B2 | 3/2007 | Borgerding | |
| 7,752,696 B2 | 7/2010 | Grunewald | |
| 7,963,075 B2 | 6/2011 | Howland | |
| 8,042,307 B2 * | 10/2011 | Digmann | B65G 69/008 160/330 |
| 8,307,588 B2 | 11/2012 | Hoffmann et al. | |
| 8,887,447 B2 | 11/2014 | Hoffmann et al. | |
| 9,003,724 B2 * | 4/2015 | Digmann | E04H 14/00 52/173.2 |
| 9,624,049 B1 * | 4/2017 | Heim | B65G 69/008 |
| 9,783,378 B2 * | 10/2017 | Ogg | B65G 69/008 |
| 2005/0279047 A1 * | 12/2005 | Kalnay | E04L 31/34305 52/641 |
| 2006/0272222 A1 * | 12/2006 | Hoffmann | B65G 69/008 52/2.12 |
| 2007/0113486 A1 | 5/2007 | Howland | |
| 2015/0007511 A1 * | 1/2015 | Digmann | B65G 69/008 52/173.2 |

FOREIGN PATENT DOCUMENTS

| | | |
|---|---|---|
| GB | 2115041 | 9/1983 |
| GB | 0567441 | 10/1993 |

* cited by examiner

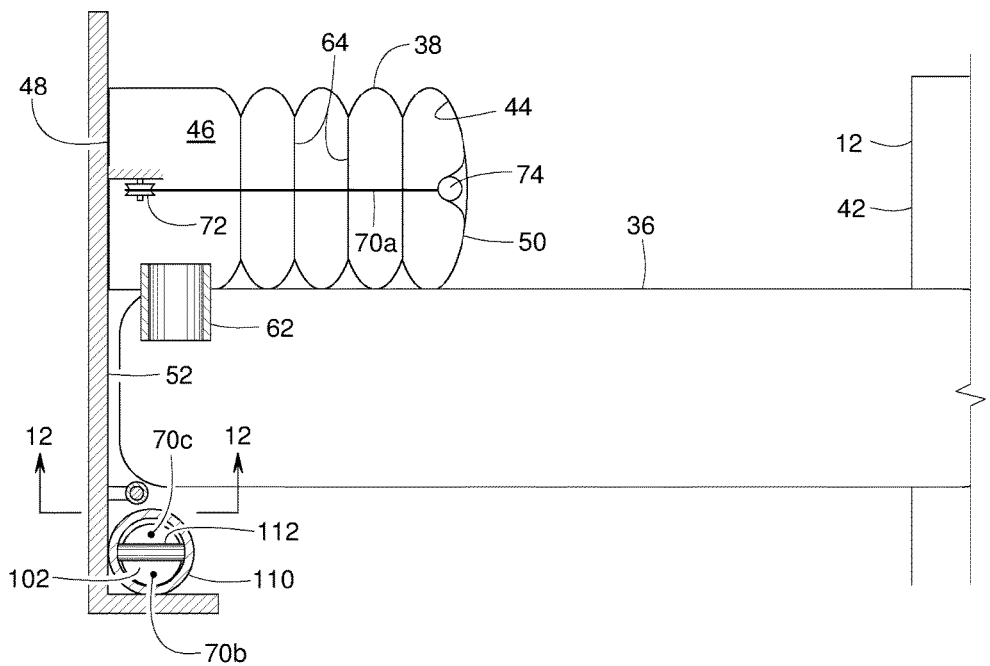
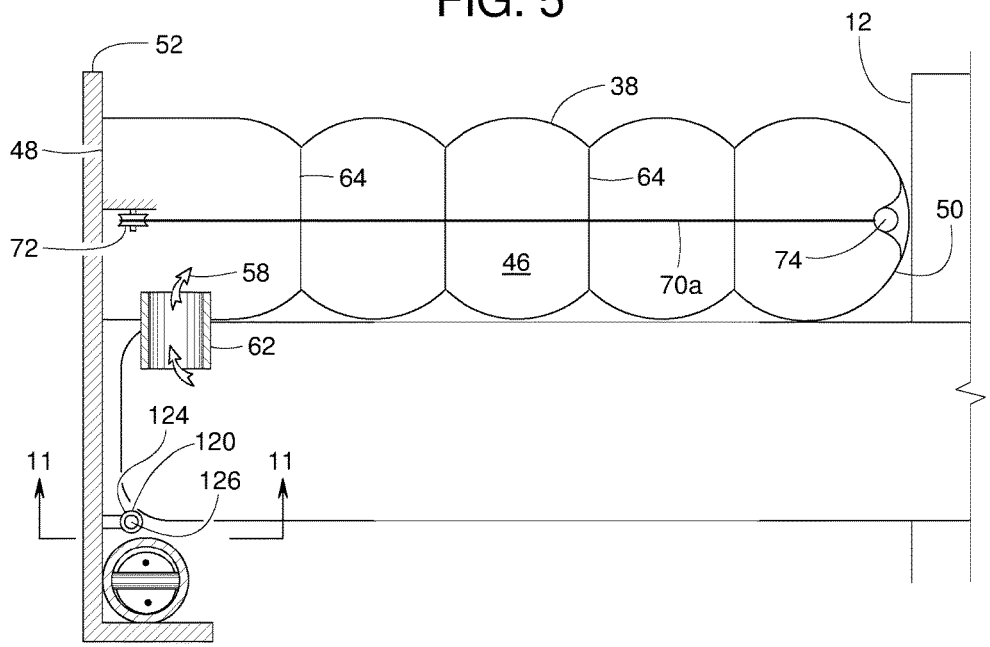

FIG. 6
FIG. 7
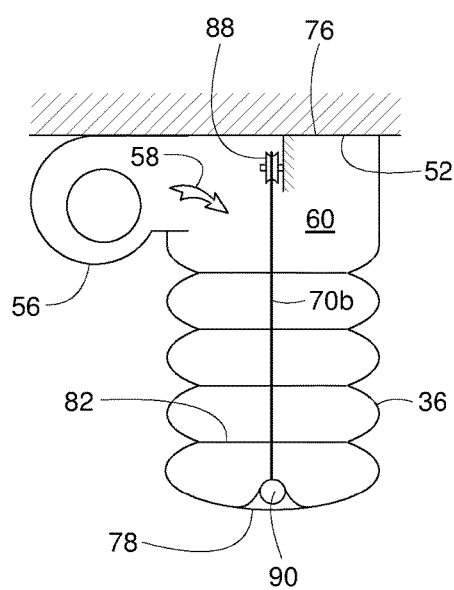
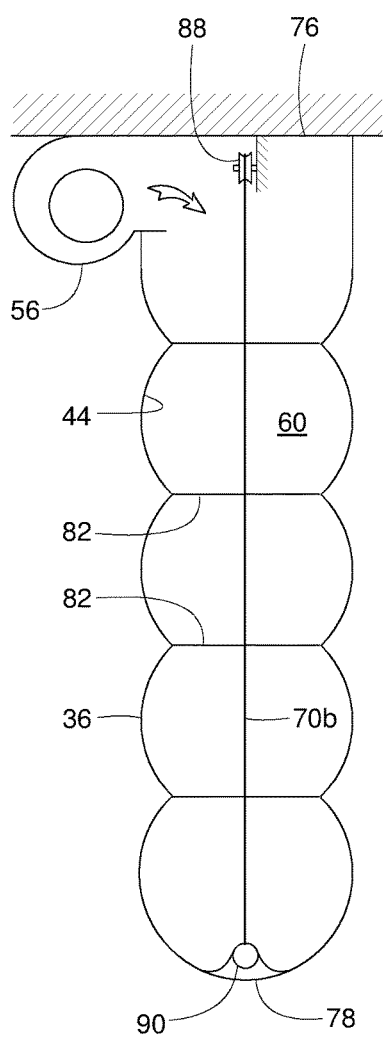

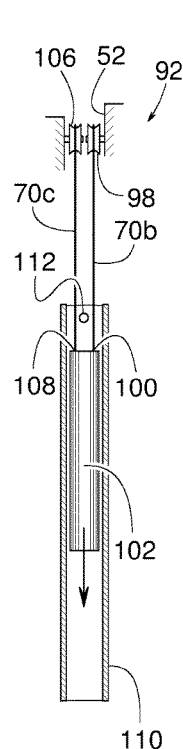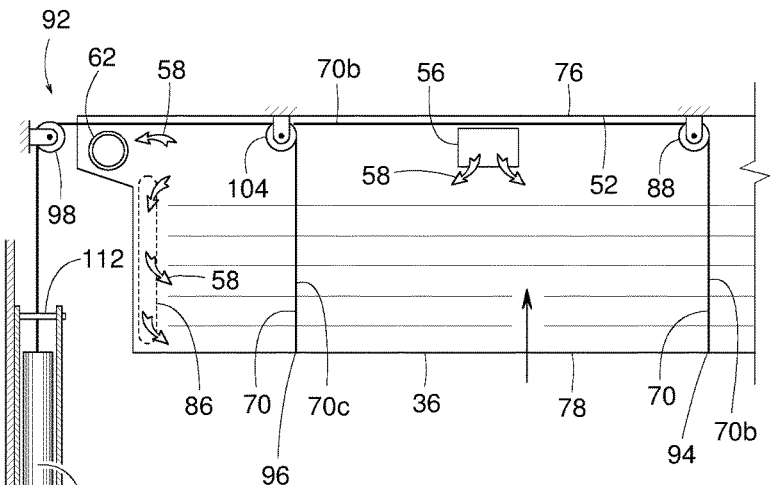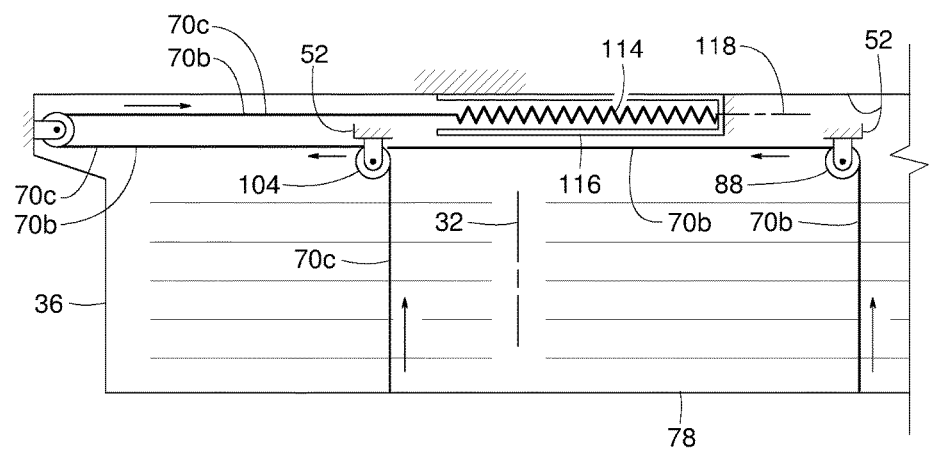

FIG. 11
FIG. 12
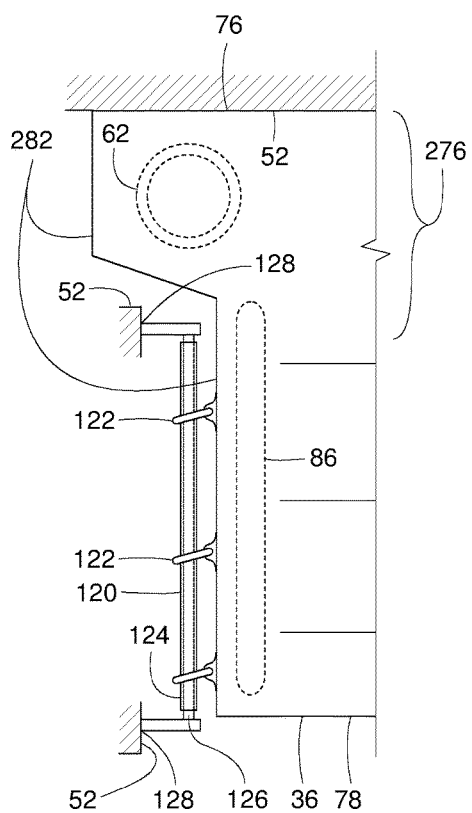
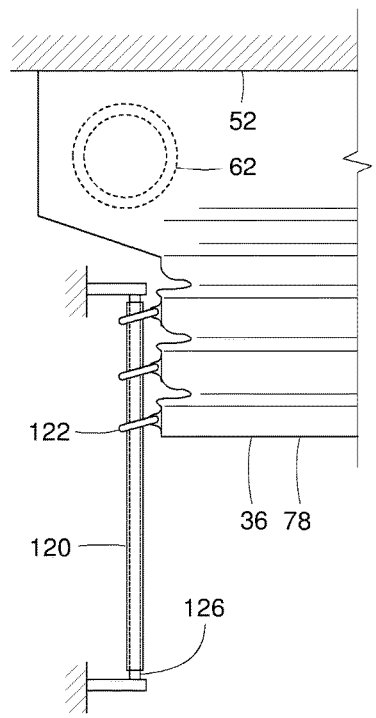

FIG. 16
FIG. 17
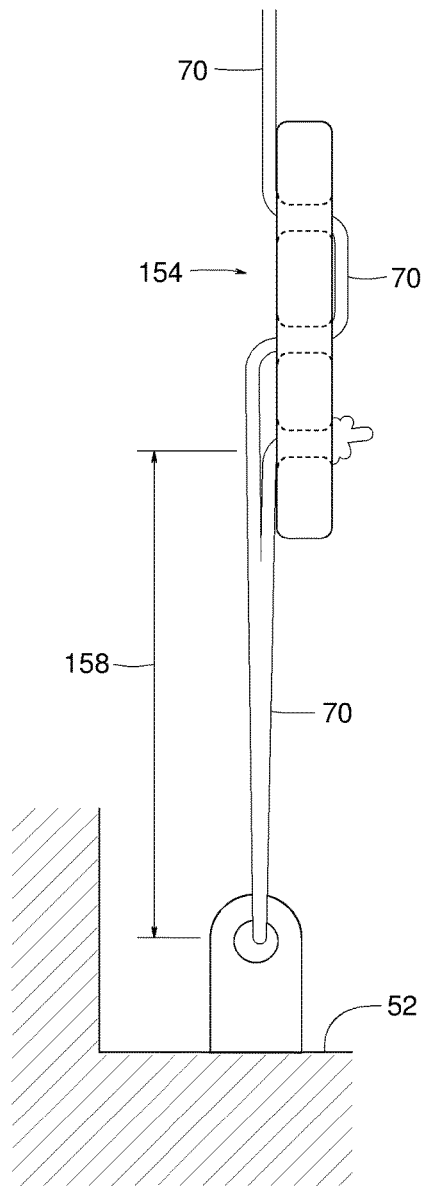
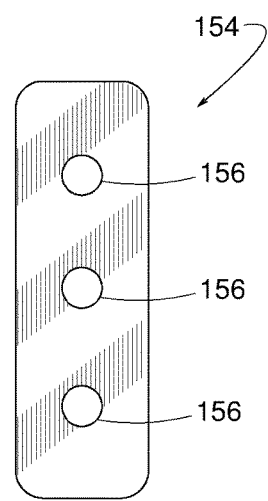

FIG. 18
FIG. 19
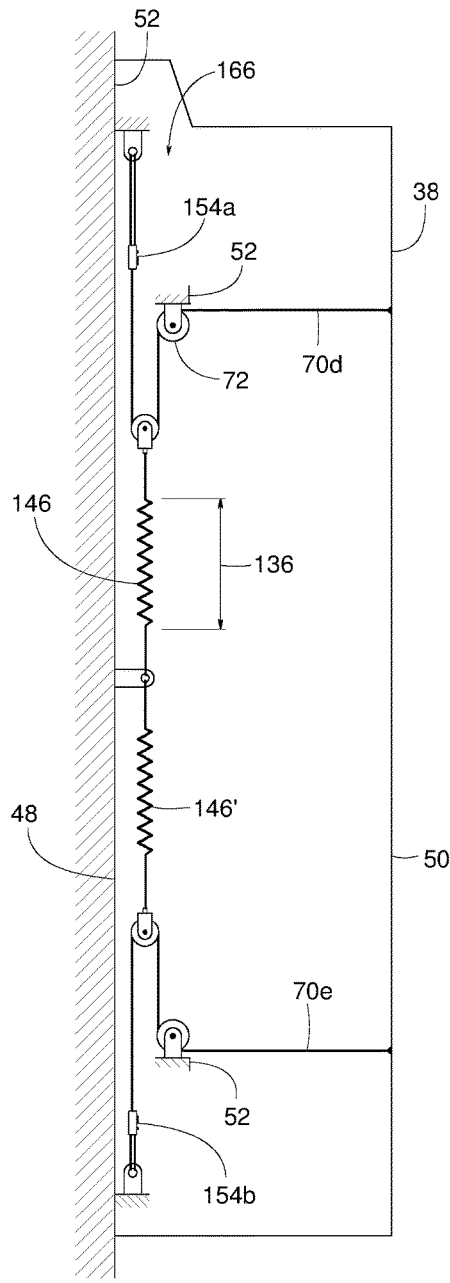
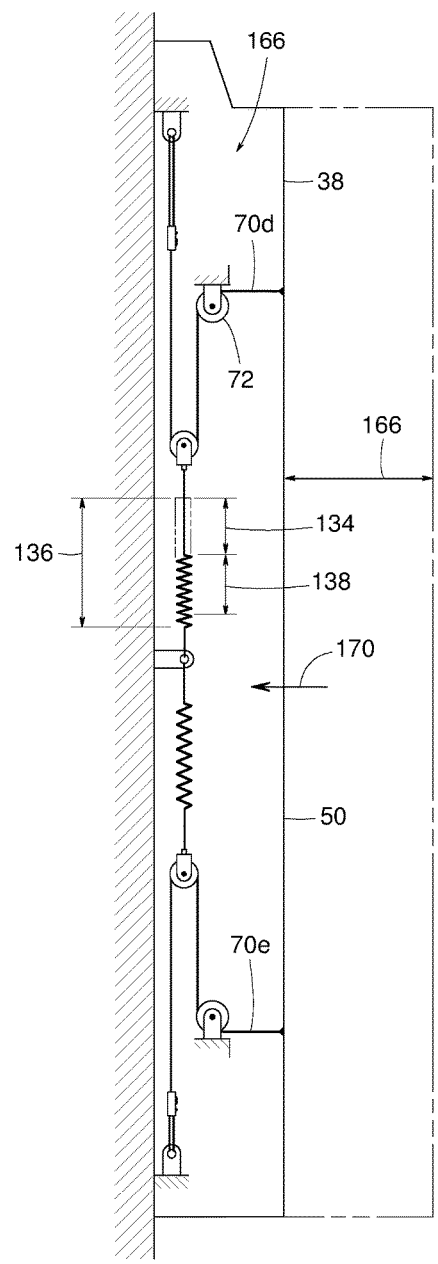

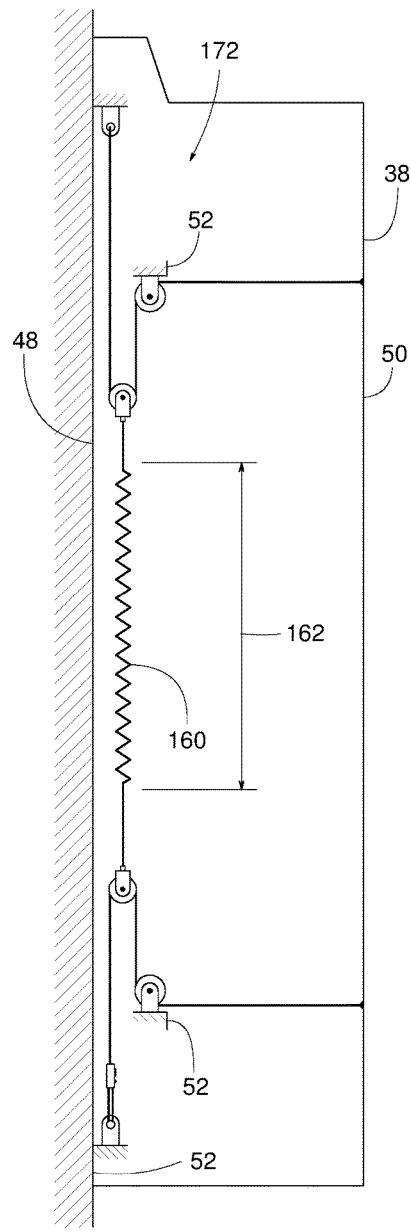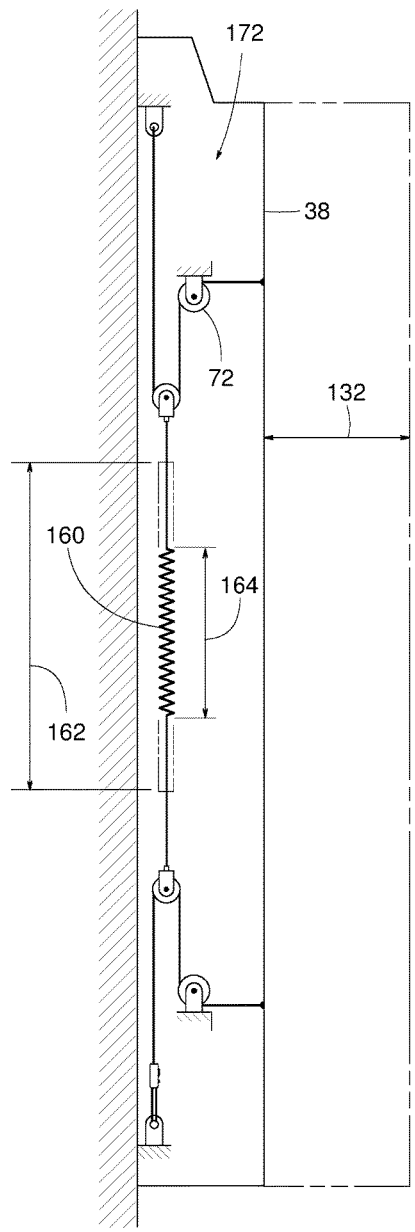

US 9,969,576 B1

INFLATABLE WEATHER BARRIERS FOR LOADING DOCKS

FIELD OF THE DISCLOSURE

This patent generally pertains to loading dock weather barriers (dock shelters) and, more specifically, to inflatable weather barriers for loading docks.

BACKGROUND

Dock weather barriers (weather barrier apparatus), such as dock shelters, prevent the ingress of outdoor environmental conditions or contaminants (e.g., rain, snow, wind, hot/cold temperatures, insects, animals, etc.) into the interior of a building and cargo area of a vehicle during the loading and/or unloading of the vehicle. Dock shelters also prevent the egress of conditioned air from within a building and/or a vehicle cargo area to the outdoor environment. Examples of dock shelters with various header structures and side structures are disclosed in U.S. Pat. Nos. 6,205,721; 6,233,885; 7,185,463; 8,307,588 and 8,887,447; all of which are specifically incorporated by reference herein.

Some known dock shelters may include a weighted fabric curtain that hangs downwardly to contact or seal against the top of a truck trailer to form an environmental barrier along the top of the trailer.

Another type of dock shelter/seal uses inflatable side bellows and header bellows, such as those shown in U.S. Pat. Nos. 5,553,424; 5,109,639; 5,007,211 and 4,750,299; all of which are specifically incorporated by reference herein. In some examples, a blower inflates the bellows so that they sealingly compress against the rear upper and side surfaces of the vehicle. Inflatable bellows provide a relatively high quality seal between a rear portion of the vehicle and the outside building wall surrounding the dock.

BRIEF DESCRIPTION OF THE DRAWINGS

FIG. 4 is a cross-sectional view taken along line 4-4 of FIG. 1.

FIG. 5 is a cross-sectional view taken along line 5-5 of FIG. 2.

FIG. 6 is a cross-sectional view taken along line 6-6 of FIG. 1 but with the vehicle and the example side bellows of the example weather barrier omitted for clarity.

FIG. 7 is a cross-sectional view taken along line 7-7 of FIG. 2 but with the vehicle and the example side bellows of the example weather barrier omitted for clarity.

FIG. 8 is a left side view of FIG. 9.

FIG. 9 is cross-sectional view taken along line 9-9 of FIG. 3.

FIG. 10 is a cross-sectional view similar to FIG. 9 but showing an example bellows return system constructed in accordance with the teachings disclosed herein that may be used to implement the example weather barrier of FIGS. 1-9.

FIG. 11 is a cross-sectional view taken along line 11-11 of FIG. 5.

FIG. 12 is a cross-sectional view taken along line 12-12 of FIG. 4.

FIG. 16 is a side view of an example adjuster disclosed herein.

FIG. 17 is a front view of another example adjuster disclosed herein.

FIG. 18 is a schematic front view of another example side bellows with another example bellows return system constructed in accordance with the teachings disclosed herein, where the side bellows is in an extended position.

FIG. 19 is a schematic front view similar to FIG. 18 but showing the example side bellows in a retracted position.

FIG. 20 is a schematic front view of yet another example side bellows with another example bellows return system constructed in accordance with the teachings disclosed herein, where the side bellows is in an extended position.

FIG. 21 is a schematic front view similar to FIG. 20 but showing the example side bellows in a retracted position.

DETAILED DESCRIPTION

Example weather barriers for loading docks are disclosed herein. An example weather barrier disclosed herein includes an inflatable seal. For example, example weather barrier apparatus disclosed herein include inflatable upper and/or side seals provided via a bellows to seal against a rear surface and/or a roof of a vehicle parked at the loading dock. The weather barriers disclosed herein include retracting mechanism(s) to retract the bellows of the upper and/or side seals when the weather barrier apparatus is not in use (e.g., when a vehicle is not at a loading dock or disengaged from the weather barrier apparatus). In some examples, example weather barrier apparatus disclosed herein employ spring powered tackle arrangements that function as a mechanical multiplier to increase (e.g., maximize) a travel distance of the bellows seal for a given extension/retraction of a spring. In some examples, example bellows retraction systems disclosed herein employ one or more springs with reduced spring movement that are sufficiently compact to fit within an interior air chamber of the bellows seal (e.g., the upper and/or side seals).

Figure 1:
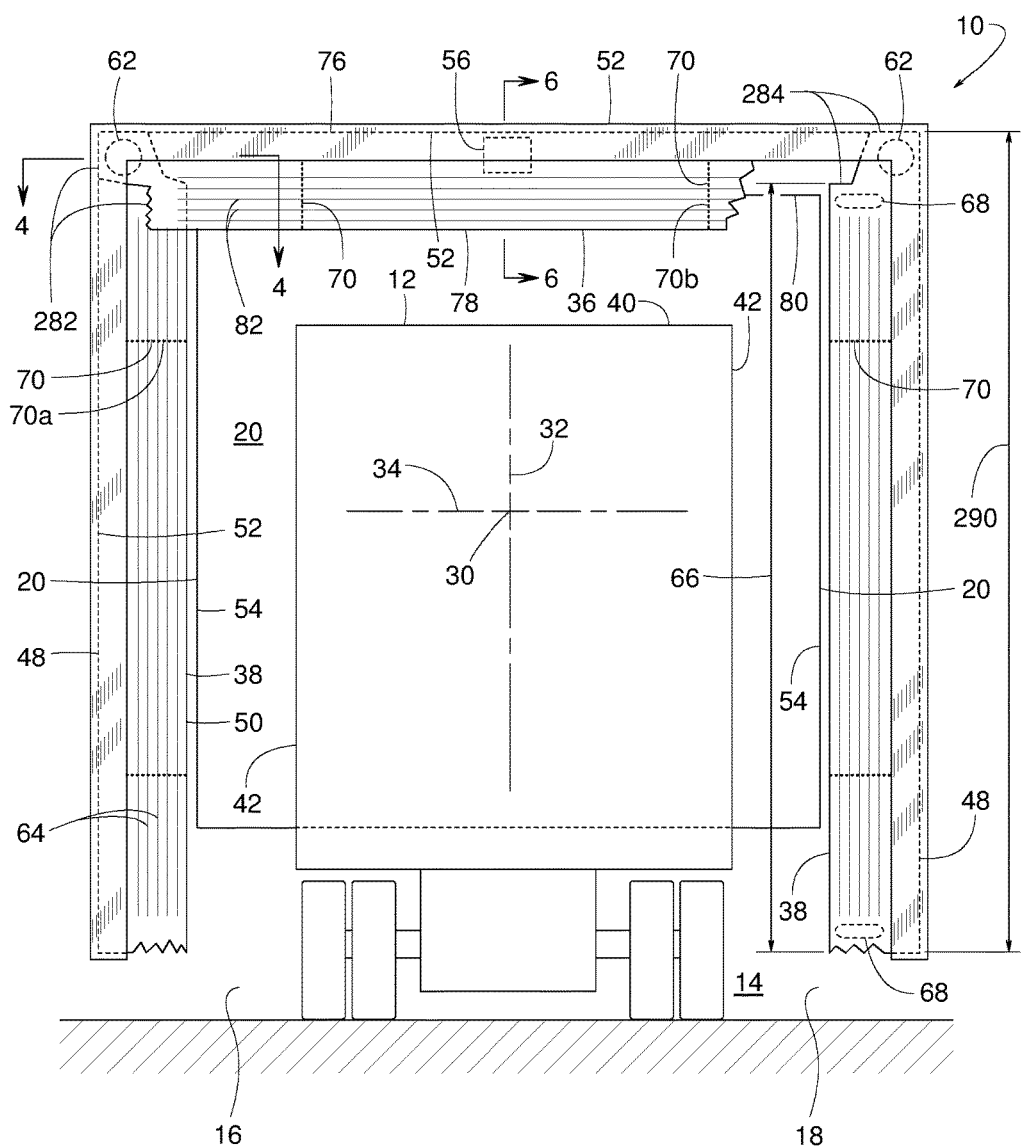
FIG. 1 is a front view of an example weather barrier constructed in accordance with the teachings disclosed herein, where portions of the example weather barrier are cut away, and the example weather barrier is shown in a retracted position.
Figure 2:
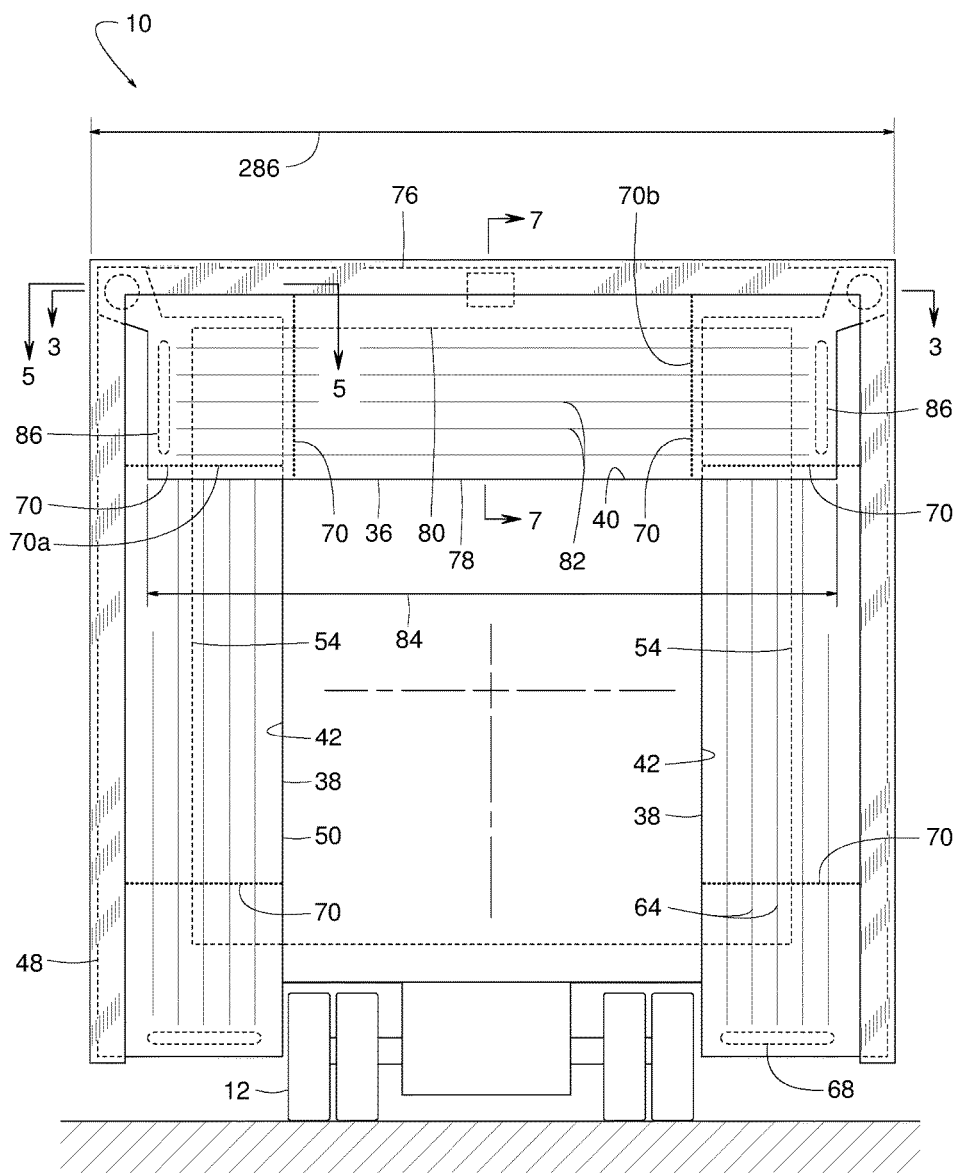
FIG. 2 is a front view similar to FIG. 2 but showing the example weather barrier in an expanded position sealing against a vehicle.
Figure 3:
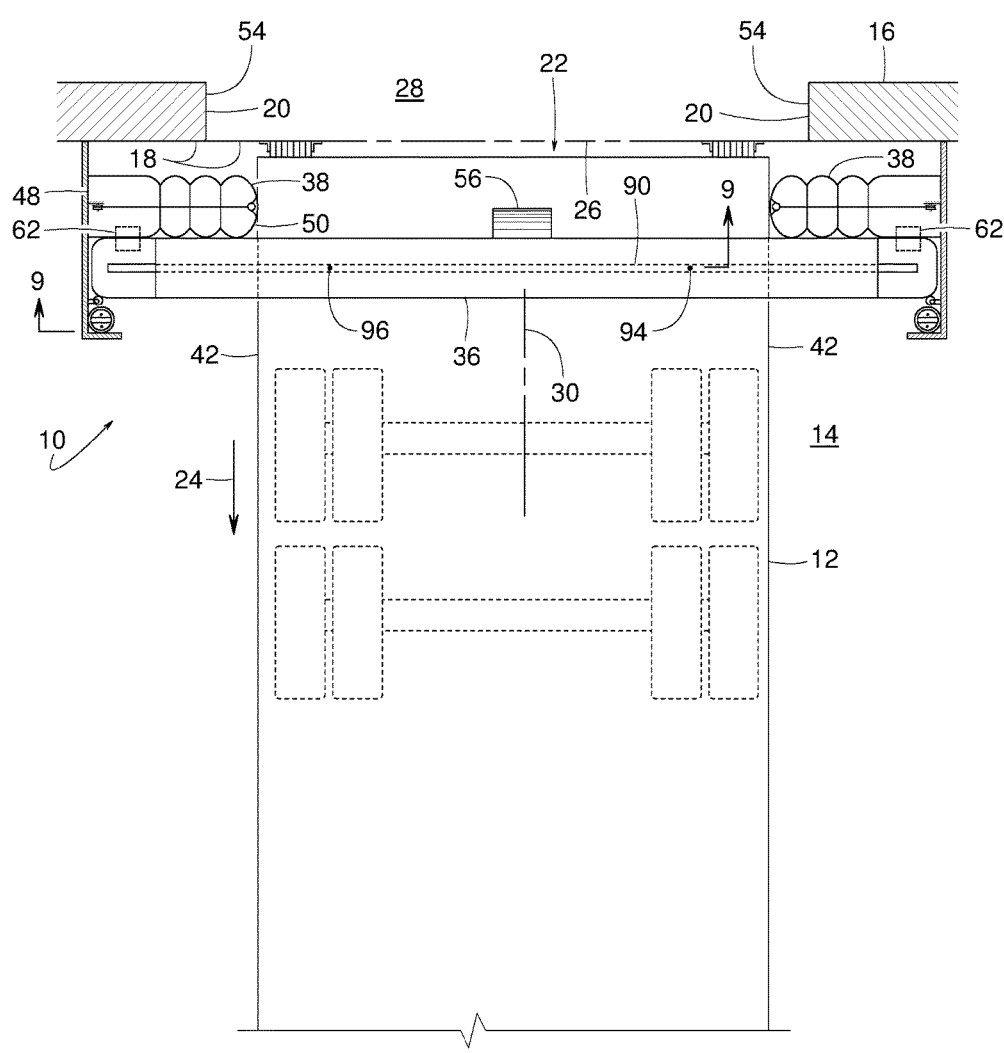
FIG. 3 is a cross-sectional view taken along line 3-3 of FIG. 2.

FIGS. 1-3 show an example weather barrier 10 constructed in accordance with the teachings of this disclosure. The weather barrier 10 of the illustrated example includes inflatable seals that inflates to at least partially seal or shelter vehicle 12 (e.g., truck, trailer, etc.) parked at a loading dock 14 of a building 16. The weather barrier 10 of the illustrated example mounts to the building's wall 18, along the perimeter of a doorway 20, and is to seal against the upper and/or side portions of a rear surface or rear end 22 of the vehicle 12. The exterior of wall 18 faces in a forward direction 24 toward vehicle 12. Doorway 20 lies along a plane 26 defined by wall 18 and is generally aligned with a rear cargo door opening of vehicle 12. This allows cargo, sheltered from weather, to be transferred between vehicle 12 and an interior dock area 28 of building 16.

For (e.g., spatial) reference, plane 26 is substantially coplanar with wall 18. A longitudinal axis 30 perpendicular to plane 26 is centrally located within doorway 20. Forward direction 24 is parallel to longitudinal axis 30 and points away from building 16. A vertical axis 32 intersects (e.g., is perpendicular to) longitudinal axis 30. A horizontal lateral axis 34 intersects (e.g., is perpendicular to) longitudinal axis 30 and vertical axis 32.

The weather barrier 10 of the illustrated example includes an inflatable upper bellows 36, and one or more (e.g., two) inflatable side bellows 38 (e.g., a right-side bellows and a left-side bellows). In some examples, the weather barrier 10 may have different structural arrangements. For instance, in some examples, weather barrier 10 includes upper bellows 36 to seal against a roof 40 of the vehicle 12 and two resiliently compressible, or otherwise non-inflatable side members, to seal laterally against respective sides 42 of the vehicle 12. In other examples, weather barrier 10 includes the (e.g., two) inflatable side bellows 38 to seal laterally against the sides 42 of the vehicle 12 and a curtain, or otherwise non-inflatable header, to seal against the roof 40 of the vehicle 12. The term, "bellows" refers to an inflatable bag or vessel that is not necessarily pleated. Some bellows may include pleats and some bellows may not include pleats. The term "non-inflatable" refers to a non-bellows seal such as a compressible foam seal.

In some examples, each side bellows 38 includes a pliable material 44 (e.g., an 8-ounce vinyl sheeting) that defines an internal side air chamber 46. Side air chamber 46 extends laterally between an outward portion 48 and an inward portion 50 of side bellows 38. Outward portion 48 connects to a generally stationary frame 52 proximate the doorway's lateral edges 54. To expand side bellows 38 by inflation, a blower 56 discharges air 58 into a header air chamber 60 of upper bellows 36. The discharged air travels laterally through header air chamber 60, through one or more (e.g., two) air transfer tubes 62, and into side air chamber 46 of each side bellows 38. The inflation expands each side bellows 38 from a retracted position (e.g., shown in FIGS. 1 and 4) to an extended position (e.g., shown FIGS. 2, 3 and 5). In the retracted position, side bellows 38 is in a compact and/or vertically elongate shape to provide lateral clearance for vehicle 12 to back in between the side bellows 38, as shown in FIG. 1. When expanded to the extended position, side bellows 38 seal laterally against the respective sides 42 of the vehicle 12 as shown, for example, in FIGS. 2 and 3.

To limit expansion of side bellows 38 in a direction parallel to longitudinal axis 30, some examples of side bellows 38 include a series of horizontally spaced apart internal baffles 64. Baffles 64 are attached (e.g., sewn) to the front and back faces of each side bellows 38. In some examples, a vertical length of each baffle 64 is appreciably less than a vertical inward length 66 of side bellows 38. This creates internal lateral (e.g., horizontal) airflow paths 68 to convey air 58 along a (e.g., full) lateral width of side bellows 38 and throughout side air chamber 46.

To return side bellows 38 from the extended position to the retracted position, the example weather barrier 10 employs a bellows return system (as described in greater detail below). For example, the bellows return system of the illustrated example includes a pliable elongate member 70 (e.g., pliable elongate members 70a-g), under spring or counterweight tension, that draws the side bellow's inward portion 50 toward outward portion 48. Thus, when the blower 56 is deactivated or does not provide air to the air chamber 46, the bellows return system returns or retracts (e.g., biases or urges) the side bellows 38 to the retracted position. The term, "pliable" refers to an item or structure that can be bent over onto itself and subsequently straightened without the item undergoing significant permanent deformation. Examples of pliable elongate member 70 include, but are not limited to, a cord, a rope, a chain, a roller chain, a cable, a wire, a strap, a belt and/or any other retractable mechanism(s). Pliable elongate member 70 may have elastic and/or inelastic characteristic(s).

In the example shown in FIGS. 4 and 5, elongate member 70a extends between a sheave 72 attached to frame 52 and a (e.g., relatively rigid, vertically) elongate stiffener 74 (e.g., a bar, a pipe, a rod, a tube, a cylinder, etc.) attached to inward portion 50. Example materials of elongate stiffener 74 include, but are not limited to, fiberglass, metal, plastic, and wood. The terms, "pulley" and "sheave" are synonyms representing a wheel to guide a pliable elongate member which is wrapped at least partially around the wheel. Although the terms, "pulley" and "sheave" are equivalent and interchangeable, the term "pulley" will usually be used herein when the pulley/sheave rotates while its rotational axis travels in translation, and the term, "sheave" will usually be used when the pulley/sheave rotates while its rotational axis remains stationary.

In some examples, upper bellows 36 is structurally similar to side bellows 38. For instance, in the illustrated example, upper bellows 36 includes a pliable material 44 (e.g., an 8-ounce vinyl sheeting) that defines internal header air chamber 60. Header air chamber 60 extends between a top portion 76 and a bottom portion 78 of upper bellows 36. Top portion 76 connects to frame 52 proximate the upper edge 80 of the doorway. Blower 56 discharging air 58 into header air chamber 60 expands upper bellows 36 from a raised position (e.g., as shown in FIGS. 1, 6 and 12) to a lowered position (e.g., as shown in FIGS. 2, 7 and 11). In the raised position, upper bellows 36 is in a compact and (e.g., horizontally) elongate shape to provide (e.g., a vertical) clearance for vehicle 12 to back underneath the upper bellows 36. When expanded to the lower position, upper bellows 36 seals down against the roof 40 of vehicle 12.

To limit the expansion of the upper bellows 36 in a direction parallel to longitudinal axis 30, some examples of upper bellows 36 include a series of (e.g., vertically) internal baffles 82 that are spaced relative to each other. Baffles 82 are attached (e.g., sewn) to the front and back faces of upper bellows 36. In some examples, the (e.g., horizontal) length of each baffle 82 is appreciably less than the (e.g., horizontal) bottom length 84 (FIG. 13) of upper bellows 36 to provide or create internal (e.g., vertical) airflow paths 86 to convey air 58 along the full height of upper bellows 36 and/or throughout header air chamber 60.

To return upper bellows 36 from the lowered position to the raised position, the weather barrier 10 of the illustrated example employs a bellows return system. For example, when blower 56 is deactivated, a pliable elongate member 70b of an example bellows return system, under spring or counterweight tension, draws the upper bellow's bottom portion 78 upward toward top portion 76. Examples of pliable elongate member 70b include, but are not limited to, a cord, a rope, a chain, a roller chain, a cable, a wire, a strap, a belt and/or any other retractable mechanism(s). Some examples of pliable elongate member 70b may have elastic or inelastic characteristic(s).

In the example shown in FIGS. 6 and 7, elongate member 70b extends between a sheave 88 attached to frame 52 and a relatively rigid (e.g., horizontally) elongate stiffener 90 (e.g., a bar, a pipe, a rod, a tube, a cylinder, etc.) attached to bottom portion 78. Example materials of elongate stiffener 90 include, but are not limited to, fiberglass, metal, plastic, wood, etc.

To more broadly distribute the upward force that lifts upper bellows 36 to the raised position, an example bellows return system 92, as shown in FIGS. 8 and 9, has one or more (e.g., two) pliable elongate members 70 attached to the elongate stiffener 90 of the upper bellows 36 at points 94 and 96. In this illustrated example, a first pliable elongate member 70b extends upward from first point 94 on (e.g., horizontally) elongate stiffener 90, wraps up and over the top of first sheave 88, wraps over and down another stationary sheave 98, and connects to a first point 100 on a counterweight 102. A second pliable elongate member 70c extends upward from second point 96 on (e.g., horizontally) elongate stiffener 90, wraps up and over the top of a second sheave 104, wraps over and down another stationary sheave 106, and connects to a second point 108 on counterweight 102. In this example, the weight of counterweight 102 applies tension to pliable elongate members 70b and 70c, which urges upper bellows 36 to its upper position.

In examples where pliable elongate members 70b and 70c are a braided or twisted cord, as counterweight 102 moves or travels relative to (e.g., within) a guide tube 110, counterweight 102 may rotate about a vertical axis within tube 110. Such rotation can cause pliable elongate members 70b and 70c to twist within tube 110, which can cause them to bind on sheave 98 and 106. To avoid the elongate members 70b and 70c from twisting, some examples of weather barrier 10 include a divider 112 that separates pliable elongate members 70b and 70c and prevents them from twisting (e.g., in the area between the upper end of tube 110 and the two sheaves 98 and 102). In some examples, divider 112 is an (e.g., horizontally) elongate member (pin, rod, bar, etc.) attached to the upper end of tube 110.

In the example shown in FIG. 10, counterweight 102 is replaced by an extension spring 114 installed within a (e.g., horizontal) guide or tube 116. The term, "extension spring" refers to any member that exerts a resilient force in a lengthwise direction of the member, where the resilient force increases with increasing length of the member. Examples of extension spring 114 include, but are not limited to, a helical spring, a tension spring, a drawbar spring, an elastic strap, an elastic cord, a gas spring and/or any other suitable biasing element(s). In this example, the tension in extension spring 114 applies tension to pliable elongate members 70b and 70c, which urges or biases upper bellows 36 toward the upper position.

For compactness (e.g., reduce an overall dimensional profile of the bellows return system), extension spring 114 of the illustrated example has a longitudinal centerline 118 that is angularly displaced (e.g., canted) out of parallel alignment relative to vertical axis 32. In other words, the longitudinal centerline 118 of the extension spring 114 is not vertical (e.g., is not parallel relative to vertical axis 32). To avoid obstructing the path of vehicle 12, some examples of extension spring 114 extend substantially horizontally and/or substantially perpendicular to at least a portion of pliable elongate member 70b. In some examples, tube 116 and spring 114 are installed within header air chamber 60. Such an arrangement is compact, provides a neat and clean appearance, and protects spring 114 and associated components from weather and/or debris.

To help guide (e.g., vertical) movement of upper bellows 36, some examples of weather barrier 10 include a, (e.g., vertically elongate) guide rod 120 mounted to frame 52 at a substantially fixed position as shown, for example, in FIGS. 11 and 12. The guide rod 120 of the illustrated example helps ensure that upper bellows 36 lies generally parallel relative to plane 26 and stays pressed sealingly back against the front face of side bellows 38. Guide rod 120 holds upper bellows 36 in such orientation even as wind or the movement of vehicle 12 tends to displace upper bellows 36. One or more sliders 122 (e.g., rings, hooks, loops, clips, etc.) attached to upper bellows 36 slide along guide rod 120 as upper bellows 36 extends and retracts. To smoothen the sliding motion, guide rod 120 of the illustrated example includes a plastic sleeve 124 on a metal cylinder 126. In the illustrated examples, guide rod 120 connects to frame 52 at (e.g., two) substantially stationary anchor points 128, where sliders 122 (in the form of rings) are free to slide along substantially the full length between the (e.g., two) anchor points 128.

In the example shown in FIG. 10, the travel distance of the bottom portion 78 of the upper bellows 36 and the travel distance of extension spring 114 are equal in magnitude (i.e., their travel distances are in a 1:1 bellows/spring ratio). Higher ratios, however, can be achieved with shorter springs and less space or dimensional profile needed for storing the extension spring and associated items used for retracting upper bellows 36. In some examples, consuming less storage space allows much or an entire dimensional profile or structure (e.g., or components such as frames, pulleys, sheaves, springs, etc.) of a bellows return system to be stored internally within header air chamber 60, which can provide a neat and clean appearance and can protect the extension spring and associated components from weather and debris. Such configuration may be provided to side bellows 38.

FIGS. 13-15 and 18-27 show various example bellows return systems having a bellows/spring ratio equal to or greater than a 1:1 ratio. The bellows/spring ratio is defined as the travel distance of a bellows' leading edge 130 (e.g., bottom portion 78 or inward portion 50) divided by the delta-length of an extension spring used to retract the bellows.

Figure 13:
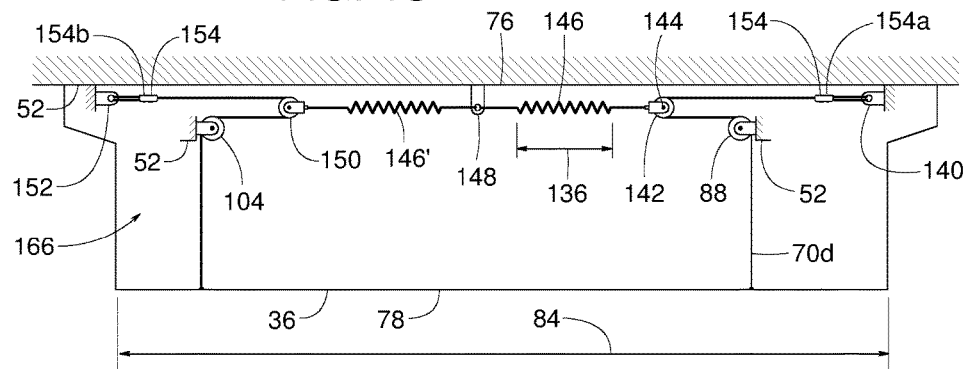
FIG. 13 is a schematic front view of another example upper bellows with another example bellows return system constructed in accordance with the teachings disclosed herein, where the upper bellows is in a lowered position.
Figure 14:
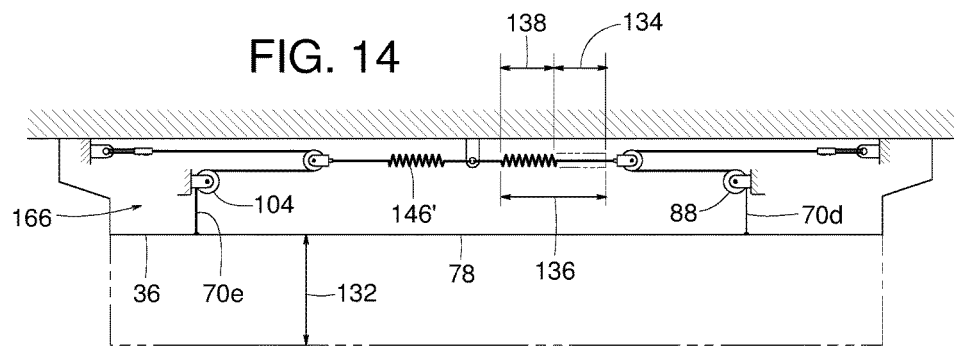
FIG. 14 is a schematic front view similar to FIG. 13 but showing the example upper bellows in a raised position.

In the example shown in FIGS. 13 and 14, an example bellows return system 166 has a bellows/spring ratio of about 2:1. The 2:1 ratio is calculated as a ratio of a bellows travel distance 132 divided by a delta-length 134. Bellows travel distance 132 is a certain distance that the bottom portion 78 travels as upper bellows 36 retracts, and delta-length 134 equals spring length 136 (e.g., at bellows' lowered position) minus spring length 138 (e.g., at bellows' raised position).

In this example, a first pliable elongate member 70*d* extends between the bottom portion 78 or the upper bellows 36 and a first substantially fixed point 140 anchored to frame 52. First elongate member 70*d* passes through a first pulley 142 having a rotational axis 144 that can translate relative to frame 52, and first sheave 88 anchored at a fixed location relative to frame 52. A first extension spring 146 acting between first pulley 142 and a central anchor point 148 that is fixed relative to frame 52 subjects first elongate member 70*d* to a portion (e.g., about half) of the tension that is in first extension spring 146. In other words, first extension spring tension in first extension spring 146 is greater than (e.g., about twice as great as) the first elongate member tension in first elongate member 70*d*.

A second pliable elongate member 70*e*, a second pulley 150, a second sheave 104, a second anchor point 152 and a central anchor point 148 are in a similar but mirror image configuration as the first pliable elongate member 70*d*. Having the mirror-image sides configured and operating similarly helps in lifting the bottom portion 78 of the upper bellows 36 more evenly from the lowered position (FIG. 13) to the raised position (FIG. 14).

To adjust or balance the lifting forces, the example bellows return system of the illustrated example includes one or more adjusters 154 (e.g., a first adjuster 154*a* and a second adjuster 154*b*). In the example of FIGS. 13 and 14, first adjuster 154*a* adjusts (e.g., increases or decreases) the tension in first elongate member 70*d*, and second adjuster 154*b* adjusts (e.g., increases or decreases) the tension in second elongate member 70*e*. Adjusters 154*a* and 154*b* of the illustrated example can adjust the tension in their respective elongate members 70*d* and 70*e* independently. FIGS. 16 and 17 show one example of adjuster 154. In the illustrated example, each adjuster 154 has three holes 156 through which elongate member 70 is threaded. A doubled-over length 158 of elongate member 70 determines a tension in that respective elongate member. Threading elongate member 70 through holes 156 to increase doubled-over length 158 places elongate member 70 in a tighter configuration for greater tension. Conversely, decreasing doubled-over length 158 places elongate member 70 in a looser configuration for less tension.

Figure 15:
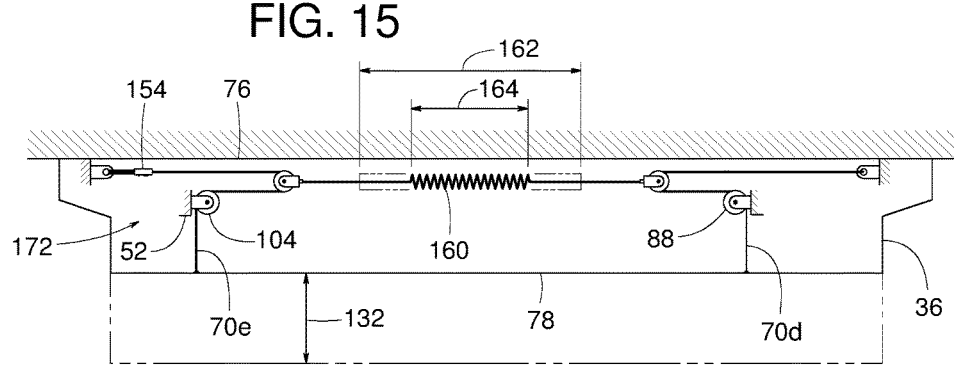
FIG. 15 is a schematic front view similar to FIG. 14 but showing another example bellows return system constructed in accordance with the teachings disclosed herein.

The example shown in FIG. 15 is similar to that of FIGS. 13 and 14. However, in the example shown in FIG. 15, a single extension spring 160 is used instead of extension springs 146 and 146', and central anchor point 148 is omitted. The example of FIG. 15 is a simpler arrangement that provides a 1:1 bellows/spring ratio. In other words, bellows' travel distance 132 of the illustrated example substantially equals the spring's delta-length, where the spring's delta-length equals spring length 162 (e.g., at bellows' lowered position) minus spring length 164 (e.g., at bellows' raised position). Without central anchor point 148, the tension in elongate members 70*d* and 70*e* remain substantially equal in magnitude. Thus, only one adjuster 154 is provided to adjust tension in elongate members 70*d* and 70*e*.

FIGS. 18 and 19 illustrates the bellows return system 166 of FIGS. 13 and 14 applied to the example side bellows 38. For example, the bellows return system 166 of FIGS. 18 and 19 is positioned sideways (e.g., vertically) relative to the positioning of the bellows return system 166 shown in FIGS. 13-14. In this orientation, the independent adjustment of the tension in elongate members 70*d* and 70*e* becomes particularly important because the weight of side bellows 38 tends to pull the higher end of bellows 38 away from frame 52 and laterally inward toward longitudinal axis 30. To compensate for this, adjuster 154*a* is set at a tighter configuration for greater tension in elongate member 70*d*, and adjuster 154*b* is set at a looser configuration for less tension in elongate member 70*e*.

In the example shown in FIGS. 18 and 19, bellows return system 166 in the sideways orientation achieves about a 2:1 bellows/spring ratio. As side bellows 38 expands from the retracted position (FIG. 19) to the extended position (FIG. 18), first extension spring 146 extends a first delta-length 134, and the bellows' inward portion 50 travels a certain distance 168 in a laterally inward direction 170. The certain distance 168 is greater than (e.g., about twice as great as) the first spring's first delta-length 134.

FIGS. 20 and 21 show the example bellows return system 172 of FIG. 15 applied to side bellows 38. In the illustrated example, the bellows return system 172 is sideways compared to the orientation of the bellows return system 172 shown in FIG. 15. By comparing the upper bellows of FIGS. 13 and 14 to the side bellows of FIGS. 18 and 19, and by comparing the upper bellows of FIG. 15 to the side bellows of FIGS. 20 and 12, it should be understood that example bellows return systems disclosed herein for use with upper bellows 36 can be readily adapted for use with side bellows 38. Consequently, the bellows return systems shown in FIGS. 22-25 are illustrated with reference to a bellows 174 with leading edge 130, where bellows 174 represents both an upper bellows and a side bellows, and leading edge 130 represents both bottom portion 78 and inward portion 50 depending on the orientation of the bellows 174.

Figure 22:
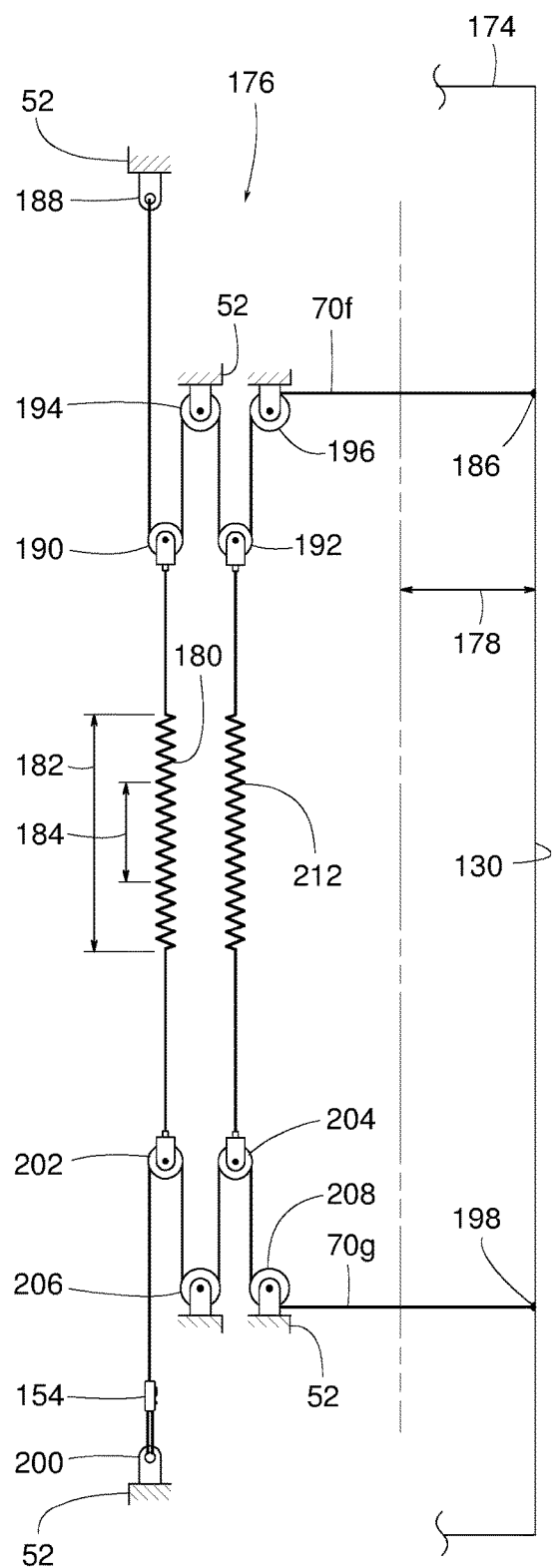
FIG. 22 is a schematic front view of another example side bellows with another example bellows return system constructed in accordance with the teachings disclosed herein.

FIG. 22 shows an example bellows return system 176 having a 2:1 bellows/spring ratio. As bellows 176 retracts a certain distance 178, a first extension spring 180 shortens a first delta-length (length 182 minus length 184). Distance 178 is greater than (e.g., about twice as great as) the first spring's first delta-length.

In this example, a first elongate member 70*f* extends between points 186 and 188, feeds through translating pulleys 190 and 192, and feeds through stationary sheaves 194 and 196. Likewise, a second elongate member 70*g* extends between points 198 and 200, feeds through translating pulleys 202 and 204, and feeds through stationary sheaves 206 and 208. Points 188 and 200 are substantially stationary and anchored to frame 52. Points 186 and 198 connect to and are movable with leading edge 130 of bellows 174. First extension spring 180 draws pulleys 190 and 202 toward each other. A second extension spring 212 draws pulleys 192 and 204 toward each other. Pulleys 190, 202, 192 and 204 transmit the extension spring tension in extension springs 180 and 212 to elongate members 70*f* and 70*g*. In the illustrated arrangement, the extension spring tension in each of extension springs 180 and 212 is appreciably greater than the tension in elongate members 70*f* and 70*g*. In some examples, the extension spring tension in each of extension springs 180 and 212 is about twice as great as the tension in elongate members 70*f* and 70*g*. In this example, a single adjuster 154 adjusts the tension equally in both elongate members 70*f* and 70*g*.

Figure 23:
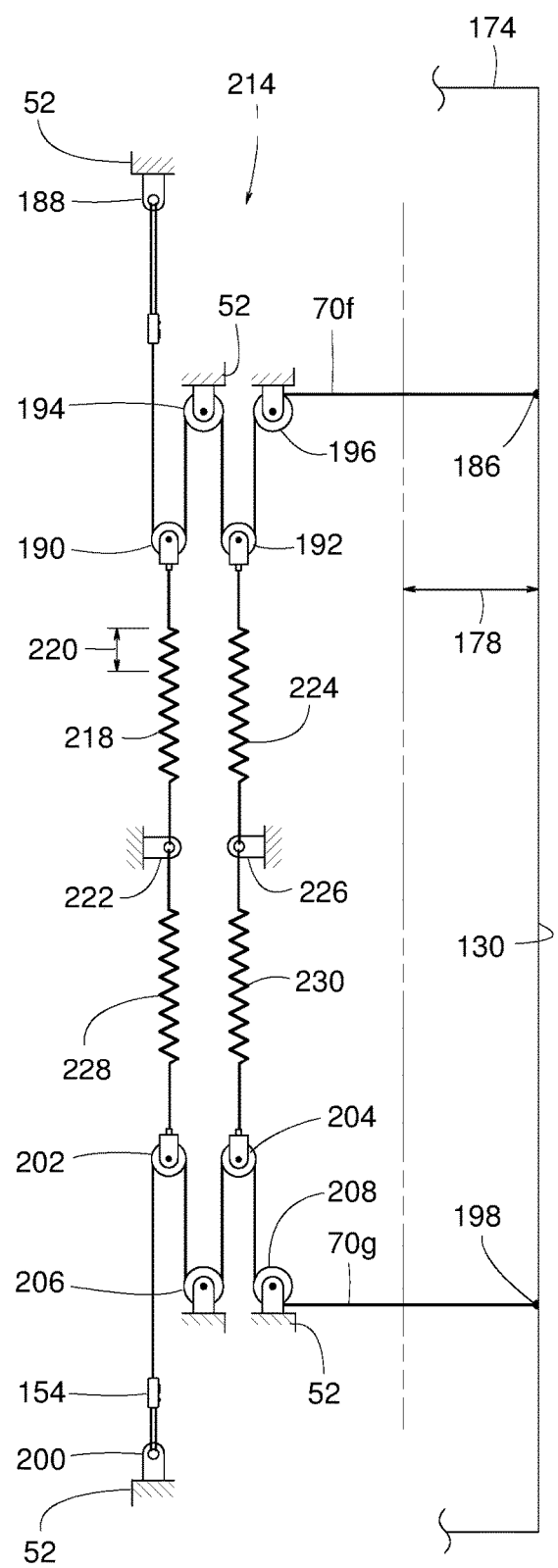
FIG. 23 is a schematic front view of another example side bellows with another example bellows return system constructed in accordance with the teachings disclosed herein.

FIG. 23 shows an example bellows return system 214 having a 4:1 bellows/spring ratio. As bellows 174 retracts a certain distance 216, a first extension spring 218 shortens a first delta-length 220. Distance 216 of the illustrated example is about four times greater than the first spring's first delta-length 220.

In this example, first elongate member 70*f* extends between points 186 and 188, feeds through translating pulleys 190 and 192, and feeds through stationary sheaves 194 and 196. Likewise, second elongate member 70g extends between points 198 and 200, feeds through translating pulleys 202 and 204, and feeds through stationary sheaves 206 and 208. Points 188 and 200 are substantially stationary and anchored to frame 52. Points 186 and 198 connect to and are movable with leading edge 130 of bellows 174.

First extension spring 218 draws pulley 190 toward an anchored point 222 that is stationary relative to frame 52. A second extension spring 224 draws pulley 192 toward an anchored point 226 that is stationary relative to frame 52. A third extension spring 228 draws pulley 202 toward anchored point 222. A fourth extension spring 230 draws pulley 204 toward anchored point 226.

Pulleys 190 and 192 transmit the extension spring tension in each of extension springs 218 and 224 to first elongate member 70f. Pulleys 202 and 204 transmit the extension spring tension in each of extension springs 228 and 230 to second elongate member 70g. In this arrangement, the extension spring tension in each of extension springs 218 and 224 is appreciably greater than the tension in first elongate member 70f, and the extension spring tension in each of extension springs 228 and 230 is appreciably greater than the tension in second elongate member 70g. In some examples, the extension spring tension in each of extension springs 218 and 224 is about twice as great as the tension in first elongate member 70f, and the extension spring tension in each of extension springs 228 and 230 is about twice as great as the tension in second elongate member 70g. In the illustrated example, adjusters 154a and 154b enable independent adjustment of the tension in elongate members 70f and 70g, respectively.

Figure 24:
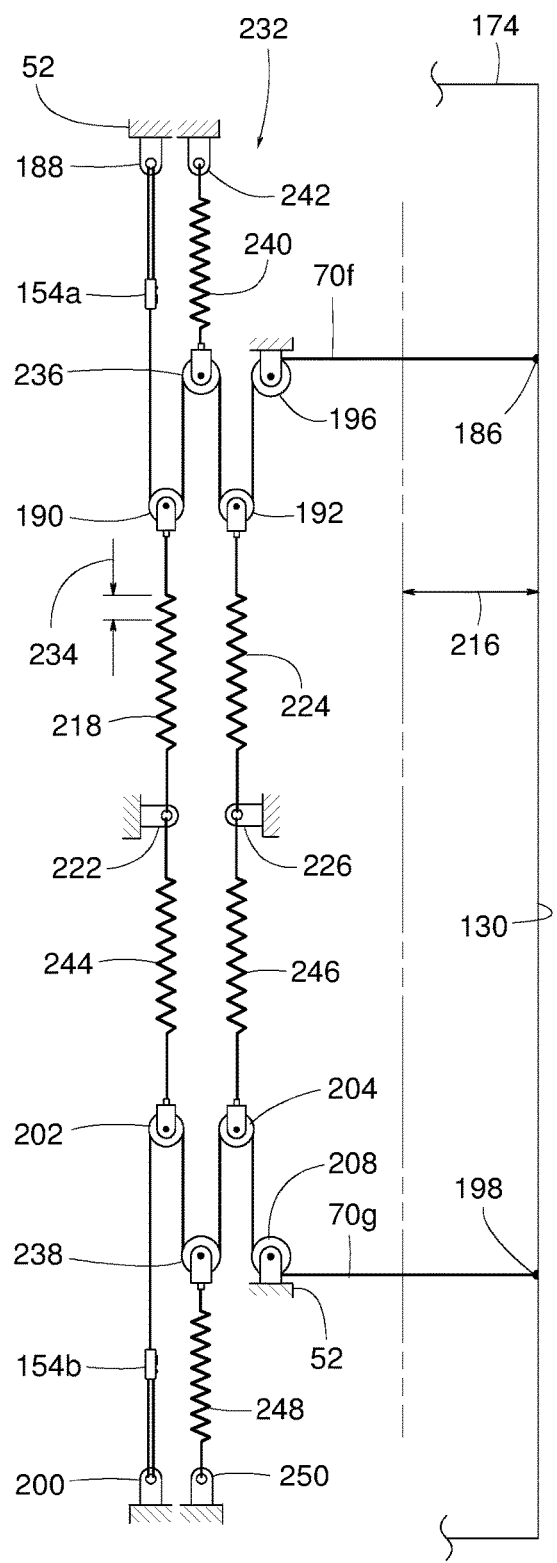
FIG. 24 is a schematic front view of another example side bellows with another example bellows return system constructed in accordance with the teachings disclosed herein.

FIG. 24 shows an example bellows return system 232 having a 6:1 bellows/spring ratio. As bellows 174 retracts a certain distance 216, first extension spring 218 shortens a first delta-length 234. Distance 216 is about six times greater than the first spring's first delta-length 234.

In this example, first elongate member 70f extends between points 186 and 188, feeds through translating pulleys 192, 236 and 190, and feeds through stationary sheave 176. Likewise, second elongate member 70g extends between points 198 and 200, feeds through translating pulleys 204, 238 and 202, and feeds through stationary sheave 208. Points 188 and 200 are substantially stationary and anchored to frame 52. Points 186 and 198 connect to and are movable with leading edge 130 of bellows 174.

First extension spring 218 draws pulley 190 toward anchored point 222 that is stationary relative to frame 52. Second extension spring 224 draws pulley 192 toward anchored point 226 that is stationary relative to frame 52. A third extension spring 240 draws pulley 236 toward an anchored point 242 that is stationary relative to frame 52. A fourth extension spring 244 draws pulley 202 toward anchored point 222. A fifth extension spring 246 draws pulley 204 toward anchor point 226. And a sixth extension spring 248 draws pulley 238 toward an anchor point 250 that is stationary relative to frame 52.

Pulleys 190, 192 and 236 transmit the extension spring tension in each of extension springs 218, 224 and 240 to first elongate member 70f. Pulleys 202, 204 and 238 transmit the extension spring tension in each of extension springs 244, 246 and 248 to second elongate member 70g. In this arrangement, the extension spring tension in each of extension springs 218, 224 and 240 is appreciably greater than the tension in first elongate member 70f, and the extension spring tension in each of extension springs 244, 246 and 248 is appreciably greater than the tension in second elongate member 70g. In some examples, the extension spring tension in each of extension springs 218, 224 and 240 is about twice as great as the tension in first elongate member 70f, and the extension spring tension in each of extension springs 244, 246 and 248 is about twice as great as the tension in second elongate member 70g. In the illustrated example, adjusters 154a and 154b enable independent adjustment of the tension in elongate members 70f and 70g, respectively.

Figure 25:
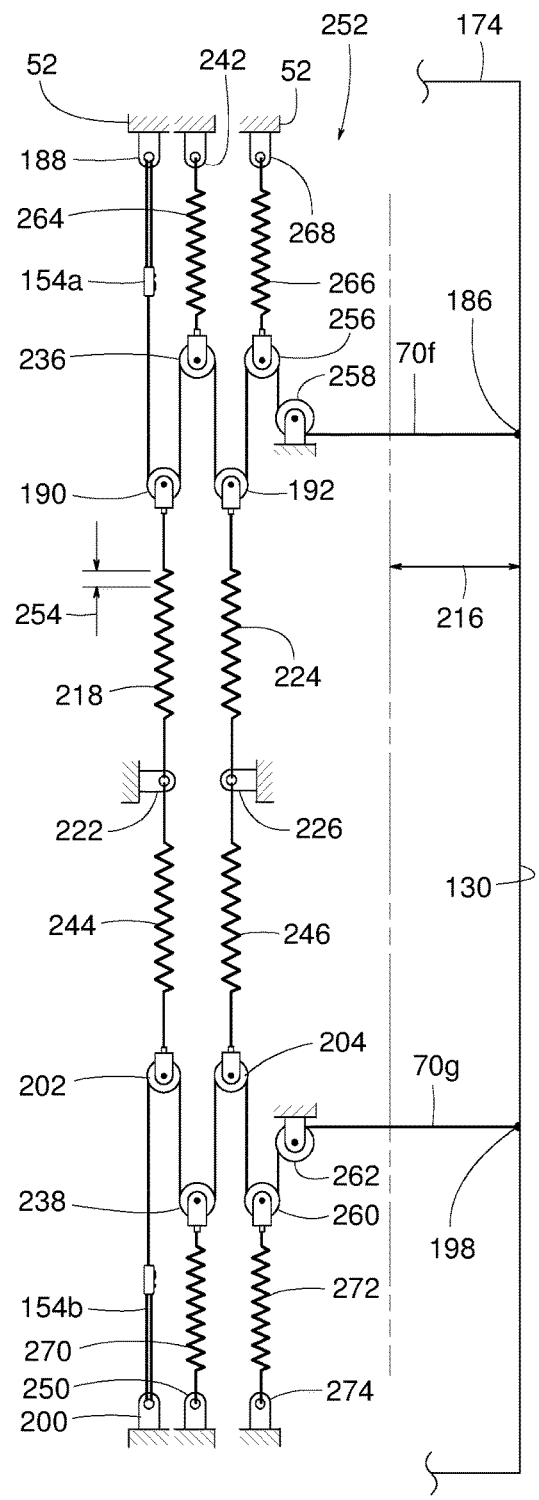
FIG. 25 is a schematic front view of an example side bellows with another example bellows return system constructed in accordance with the teachings disclosed herein.

FIG. 25 shows an example bellows return system 252 having an 8:1 bellows/spring ratio. As bellows 174 retracts a certain distance 216, first extension spring 218 shortens a first delta-length 254. Distance 216 is about eight times greater than the first spring's first delta-length 254.

In this example, first elongate member 70f extends between points 186 and 188, feeds through translating pulleys 190, 236, 192 and 256, and feeds through stationary sheave 258. Likewise, second elongate member 70g extends between points 198 and 200, feeds through translating pulleys 202, 238, 204 and 260, and feeds through a stationary sheave 262. Points 188 and 200 are substantially stationary and anchored to frame 52. Points 186 and 198 connect to and are movable with leading edge 130 of bellows 174.

First extension spring 218 draws pulley 190 toward anchored point 222 that is stationary relative to frame 52. Second extension spring 224 draws pulley 192 toward anchored point 226 that is stationary relative to frame 52. A third extension spring 264 draws pulley 236 toward an anchored point 242 that is stationary relative to frame 52. A fourth extension spring 266 draws pulley 256 toward an anchored point 268 that is stationary relative to frame 52. A fifth extension spring 244 draws pulley 202 toward anchored point 222. A sixth extension spring 246 draws pulley 204 toward anchored point 226. A seventh extension spring 270 draws pulley 238 toward an anchored point 250 that is stationary relative to frame 52. And an eighth extension spring 272 draws pulley 260 toward an anchored point 274 that is stationary relative to frame 52.

Pulleys 190, 236, 192 and 256 transmit the extension spring tension in each of extension springs 218, 224, 264 and 266 to first elongate member 70f. Pulleys 202, 204, 238 and 260 transmit the extension spring tension in each of extension springs 244, 246, 270 and 262 to second elongate member 70g. In this arrangement, the extension spring tension in each of extension springs 218, 224, 264 and 266 is appreciably greater than the tension in first elongate member 70f, and the extension spring tension in each of extension springs 244, 246, 270 and 272 is appreciably greater than the tension in second elongate member 70g. In some examples, the extension spring tension in each of extension springs 218, 224, 264 and 266 is about twice as great as the tension in first elongate member 70f, and the extension spring tension in each of extension springs 244, 246, 270, and 272 is about twice as great as the tension in second elongate member 70g. In the illustrated example, adjusters 154a and 154b enable independent adjustment of the tension in elongate members 70f and 70g, respectively.

Figure 26:
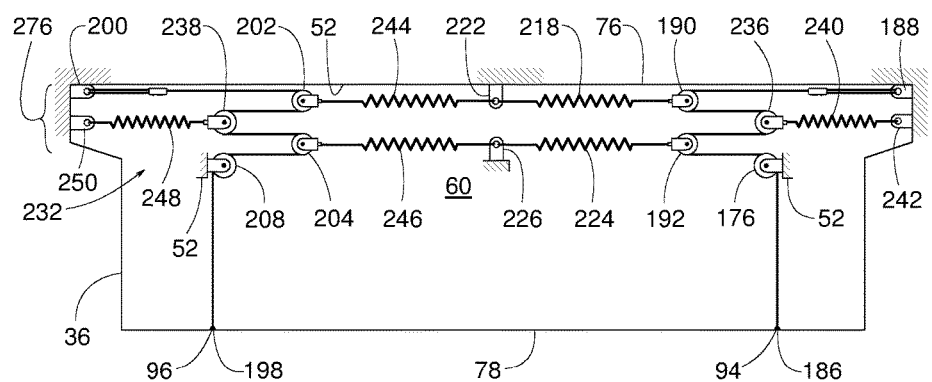
FIG. 26 is a schematic front view of an example upper bellows fitted with the example bellows return system shown in FIG. 24.
Figure 27:
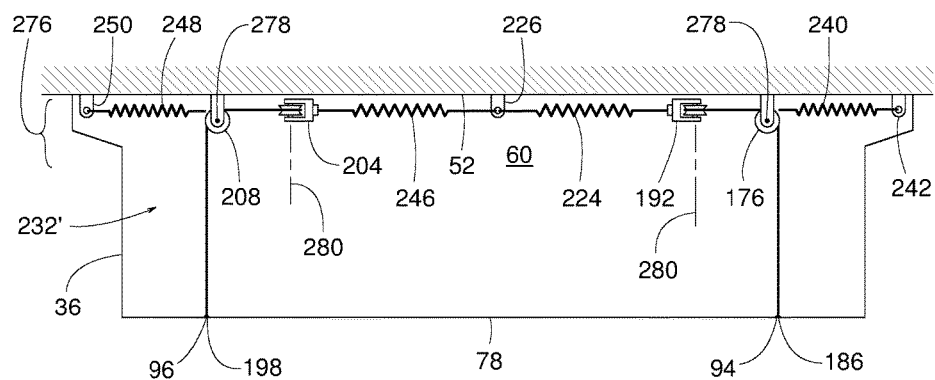
FIG. 27 is a schematic front view similar to FIG. 26 but showing the example bellows return system configured in a compact arrangement.

FIG. 26 shows the bellow return system 232 of FIG. 24 implemented with upper bellows 36. To make bellow return system 232 fit more readily within an upper portion 276 of the header air chamber 60 of the upper bellows 36, (e.g., much of the components and/or structure of) bellows return system 232 is tipped or canted ninety degrees relative to the orientation shown in FIG. 24 to create a reoriented but functionally identical bellows return system 232' shown in FIG. 27. In FIG. 27, some of the bellows return system components are not shown, as they are hidden behind the components that are shown.

In FIG. 26, the pulleys and sheaves are shown having horizontal rotational axes. However, the rotational axes of one or more of the pulleys and/or sheaves may be positioned in other orientations (e.g. non-horizontal orientation). In FIG. 27, for example, sheaves 176 and 208 each have a horizontal rotational axis 278, while pulleys 190, 236, 192, 202, 238 and 204 each have a generally vertical rotational axis 280. Thus, rotational axes 278 and 280 are angularly displaced out of parallel alignment with each other to achieve the desired compactness of bellows return system 232'.

To achieve a desired bellows compactness without the retracting portion of the bellows interfering with air transfer tube 62, some example bellows have a stepped surface 282 or 284 (FIGS. 1, 11 and 12) in the area around air transfer tube 62. In some upper bellows examples, top portion 276 of upper bellows 36 has a top length 286 (FIG. 2) extending substantially horizontally and substantially parallel to lateral axis 34. Also, bottom portion 78 of upper bellows 36 has a bottom length 84 (FIG. 2) extending substantially horizontally and/or substantially parallel to the lateral axis 34. Bottom length 84 being shorter than top length 186 creates stepped surface 282.

In some side bellows examples, outward portion 48 of side bellows 38 has an outward length 290 (FIG. 1) extending substantially vertically and/or substantially parallel relative to vertical axis 32. Also, inward portion 54 of side bellows 38 has an inward length 66 (FIG. 1) extending substantially vertically and/or substantially parallel to vertical axis 32. Inward length 66 being shorter than outward length 290 creates stepped surface 284.

Figure 28:
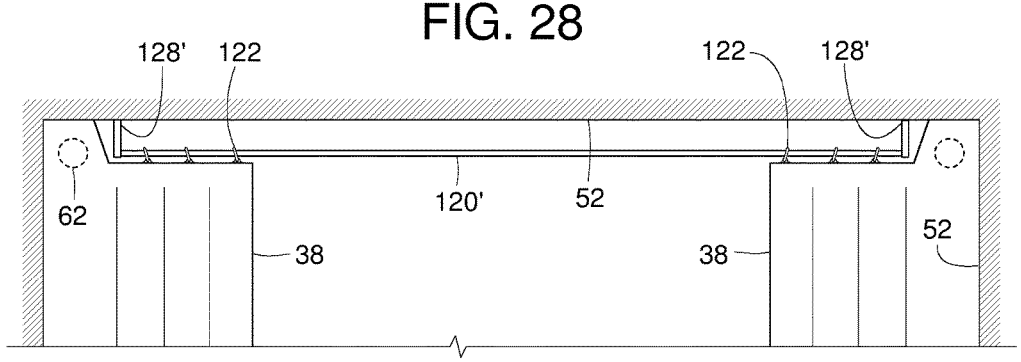
FIG. 28 is a front view showing an example guide rod for an example set of side bellows constructed in accordance with the teachings disclosed herein, where the example side bellows are shown in an extended position.
Figure 29:
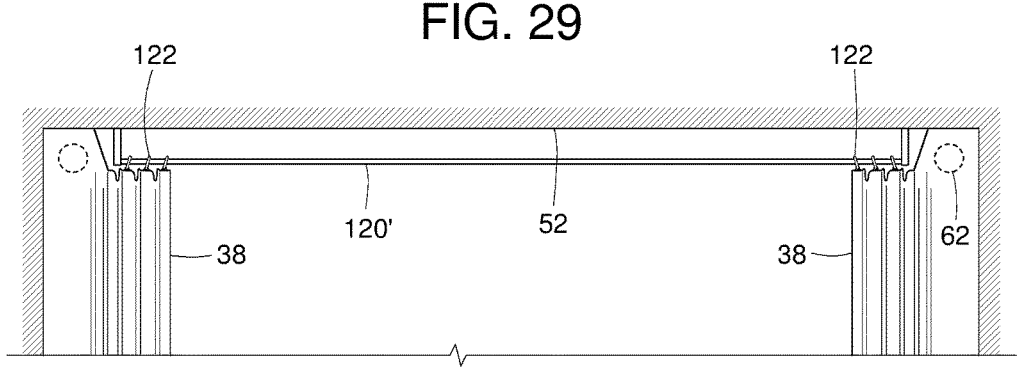
FIG. 29 is a front view similar to FIG. 28 but showing the example side bellows in a retracted position.

In addition or alternatively, some examples of weather barrier 10 include a horizontally elongate guide rod 120', as shown in FIGS. 28 and 29. FIG. 28 show side bellows 38 in the extended position, and FIG. 29 shows side bellows 38 in the retracted position. In the illustrated example, guide rod 120' connects to frame 52 at two substantially stationary anchor points 128'. Guide rod 120' of the illustrated example is similar in construction and function as guide rod 120. However, guide rod 120' of the illustrated example guides horizontal movement of side bellows 38. This helps ensure that side bellows 38 lie generally parallel to plane 26 and stay pressed sealingly up against the back face of upper bellows 36. Guide rod 120' of the illustrated example holds side bellows 38 in such orientation even as wind and/or the movement of vehicle 12 tends to displace side bellows 38.

At least some of the aforementioned examples include one or more features and/or benefits including, but not limited to, the following:

In some examples, a weather barrier is to at least partially seal or shelter a vehicle parked at a loading dock of a building. In some such examples, the building having a wall facing in a forward direction generally toward the vehicle when the vehicle is parked at the loading dock. In some such examples, the wall defining a doorway proximate a rear portion of the vehicle when the vehicle is parked at the loading dock. In some such examples, the doorway lying along a plane that is substantially coplanar with the wall. In some such examples, the plane is perpendicular to a longitudinal axis that is centrally positioned within the doorway. In some such examples, the longitudinal axis intersecting and is perpendicular to a vertical axis. In some such examples, the longitudinal axis and vertical axis interest and are perpendicular to a lateral axis that is horizontal. In some such examples, the weather barrier includes an upper bellows defining a header air chamber between a top portion and a bottom portion of the upper bellows. In some such examples, the top portion is mounted at an elevation near an upper edge of the doorway. In some such examples, the upper bellows is vertically expandable from a raised position to a lowered position. In some such examples, the bottom portion is closer to the top portion when the upper bellows is in the raised position than when the upper bellows is in the lowered position. In some such examples, the upper bellows is horizontally elongate when the upper bellows is in the raised position. In some such examples, a blower in fluid communication with the header air chamber. In some such examples, the blower is selectively activated to discharge a pressurized air into the header air chamber. In some such examples, the pressurized air urges the upper bellows toward the lowered position. In some such examples, the weather barrier includes a first extension spring under a first extension spring tension, a first pulley, and a first elongate member that is pliable. In some such examples, the first elongate member is under a first elongate member tension that urges the upper bellows toward the raised position. In some such examples, the first elongate member is connected to the bottom portion of the upper bellows. In some such examples, the first elongate member is wrapped at least partially around the first pulley. In some such examples, the first extension spring is connected to the first pulley. In some such examples, the first pulley to transmit the first extension spring tension to the first elongate member to subject the first elongate member to the first elongate member tension. In some such examples, the first extension spring tension is appreciably greater than the first elongate member tension.

In some examples, the first extension spring extends a first delta-length in response to the upper bellows expanding from the raised position to the lowered position. In some such examples, the bottom portion of the upper bellows to move a certain distance upon the upper bellows expanding from the raised position to the lowered position, where the certain distance is greater than the first delta-length.

In some examples, the first extension spring has a longitudinal centerline that is angularly displaced out of parallel alignment with the vertical axis.

In some examples, the longitudinal centerline of the first extension spring is substantially horizontal.

In some examples, the first extension spring is within the header air chamber.

In some examples, a weather barrier is to at least partially seal or shelter a vehicle parked at a loading dock of a building. In some such examples, the weather barrier includes an upper bellows defining a header air chamber between a top portion and a bottom portion of the upper bellows. In some such examples, the top portion to be mounted at an elevation near an upper edge of the doorway. In some such examples, the upper bellows is vertically expandable from a raised position to a lowered position. In some such examples, the bottom portion is closer to the top portion when the upper bellows is in the raised position than when the upper bellows is in the lowered position. In some such examples, a blower is in fluid communication with the header air chamber. In some such examples, the blower is selectively activated to discharge a pressurized air into the header air chamber. In some such examples, the pressurized air urges the upper bellows toward the lowered position. In some such examples, the weather barrier includes a first extension spring. In some such examples, the weather barrier includes a first pulley. In some such examples, the weather barrier includes a first elongate member that is pliable. In some such examples, the first elongate member is connected to the bottom portion of the upper bellows. In some such examples, the first elongate member is wrapped at least partially around the first pulley. In some such examples, the first extension spring is coupled to the first pulley. In some such examples, the first extension spring extending a first delta-length in response to the upper bellows expanding from the raised position to the lowered position. In some such examples, the bottom portion of the upper bellows to move a certain distance upon the upper bellows expanding from the raised position to the lowered position, where the certain distance being greater than the first delta-length.

In some examples, the first extension spring has a longitudinal centerline that is angularly displaced out of parallel alignment with a vertical axis that is perpendicular to and intersecting a longitudinal axis of the doorway, wherein the longitudinal axis is perpendicular to a plane that is coplanar with the wall.

In some examples, the first extension spring has a longitudinal centerline that is substantially horizontal.

In some examples, the first extension spring is within the header air chamber.

In some examples, the weather barrier includes a first sheave. In some examples, the first elongate member extends at least partially around the first sheave. In some examples, the first pulley rotates about a first rotational axis in response to the upper bellows expanding from the raised position to the lowered position. In some examples, the first sheave rotates about a second rotational axis in response to the upper bellows expanding from the raised position to the lowered position. In some examples, the second rotational axis is angularly displaced out of parallel alignment with the first rotational axis.

In some examples, the weather barrier includes a first sheave. In some examples, the first elongate member extends at least partially around the first sheave. In some examples, the first pulley rotates about a first rotational axis in response to the upper bellows expanding from the raised position to the lowered position. In some examples, the first rotational axis travels in translation in response to the upper bellows expanding from the raised position to the lowered position. In some examples, the first sheave rotates about a second rotational axis in response to the upper bellows expanding from the raised position to the lowered position. In some examples, the second rotational axis is at a substantially fixed location as the upper bellows expands form the raised position to the lowered position.

In some examples, a weather barrier is to at least partially seal or shelter a vehicle parked at a loading dock of a building. In some examples, the building has a wall facing in a forward direction generally toward the vehicle when the vehicle is parked at the loading dock. In some examples, the wall defining a doorway proximate a rear portion of the vehicle when the vehicle is parked at the loading dock. In some examples, the doorway lies along a plane that is substantially coplanar with the wall. In some examples, the plane is perpendicular to a longitudinal axis that is centrally positioned within the doorway. In some examples, the longitudinal axis intersects and is perpendicular to a vertical axis. In some examples, the longitudinal axis and vertical axis interest and are perpendicular to a lateral axis that is horizontal. In some examples, the weather barrier includes a side bellows defining a side air chamber between an outward portion and inward portion of the side bellows. In some examples, the longitudinal axis is closer to the inward portion than to the outward portion. In some examples, the side bellows being laterally expandable from a retracted position to an extended position. In some examples, the outward portion is closer to the inward portion when the side bellows is in the retracted position than when the side bellows is in the extended position. In some examples, the side bellows is vertically elongate when the side bellows is in the retracted position. In some examples, a blower is in fluid communication with the side air chamber. In some examples, the blower is selectively activated to discharge a pressurized air into the side air chamber. In some examples, the pressurized air urges the side bellows toward the extended position. In some examples, the weather barrier includes a first extension spring. In some examples, the weather barrier includes a first pulley. In some examples, the weather barrier includes a first elongate member that is pliable. In some examples, the first elongate member is connected to the inward portion of the side bellows. In some examples, the first elongate member is wrapped at least partially around the first pulley. In some examples, the first extension spring is coupled to the first pulley. In some examples, the first extension spring extends a first delta-length in response to the side bellows expanding from the retracted position to the extended position. In some examples, the inward portion of the side bellows is to move a certain distance upon the side bellows expanding from the retracted position to the extended position. In some examples, the certain distance being greater than the first delta-length.

In some examples, the first extension spring has a longitudinal centerline that is angularly displaced out of parallel alignment with the lateral axis.

In some examples, the first extension spring has a longitudinal centerline that is substantially vertical.

In some examples, the first extension spring is within the side air chamber.

In some examples, the weather barrier includes a first sheave. In some examples, the first elongate member extending at least partially around the first sheave. In some examples, the first pulley rotating about a first rotational axis in response to the side bellows expanding from the retracted position to the extended position. In some examples, the first sheave rotates about a second rotational axis in response to the side bellows expands from the retracted position to the extended position. In some examples, the second rotational axis is angularly displaced out of parallel alignment with the first rotational axis.

In some examples, the weather barrier includes a first sheave. In some examples, the first elongate member extends at least partially around the first sheave. In some examples, the first pulley rotates about a first rotational axis in response to the side bellows expanding from the retracted position to the extended position. In some examples, the first rotational axis travels in translation in response to the side bellows expanding from the retracted position to the extended position. In some examples, the first sheave rotating about a second rotational axis in response to the side bellows expanding from the retracted position to the extended position. In some examples, the second rotational axis is at a substantially fixed location as the side bellows expands form the retracted position to the extended position.

In some examples, an adjuster is coupled to at least one of the first spring and the first elongate member, the adjuster having selectively a tighter configuration and a looser configuration, the first elongate member being in greater tension when the adjuster is in the tighter configuration while the side bellows is in the extended position than when the adjuster is in the looser configuration while the side bellows is in the extended position.

In some examples, a weather barrier is to at least partially seal or shelter a vehicle parked at a loading dock of a building. In some examples, the building having a wall facing in a forward direction generally toward the vehicle when the vehicle is parked at the loading dock. In some examples, the wall defines a doorway proximate a rear portion of the vehicle when the vehicle is parked at the loading dock. In some examples, the doorway lying along a plane that is substantially coplanar with the wall. In some examples, the plane is perpendicular to a longitudinal axis that is centrally positioned within the doorway. In some examples, the longitudinal axis intersects and is perpendicular to a vertical axis. In some examples, the longitudinal axis and vertical axis interest and are perpendicular to a lateral axis that is horizontal. In some examples, the weather barrier includes a side bellows defining a side air chamber between an outward portion and inward portion of the side bellows. In some examples, the outward portion and the inward portion is vertically elongate between an upper portion and a lower portion of the side bellows. In some examples, the longitudinal axis is closer to the inward portion than to the outward portion. In some examples, the side bellows being laterally expandable from a retracted position to an extended position. In some examples, the outward portion is closer to the inward portion when the side bellows is in the retracted position than when the side bellows is in the extended position. In some examples, a blower is in fluid communication with the side air chamber. In some examples, the blower is selectively activated to discharge a pressurized air into the side air chamber. In some examples, the pressurized air urges the side bellows toward the extended position. In some examples, the weather barrier includes a first extension spring, a first pulley, and a first elongate member that is pliable. In some examples, the first elongate member extends through the upper portion and is connected to the inward portion. In some examples, the first elongate member is wrapped at least partially around the first pulley. In some examples, the first extension spring is coupled to the first pulley. In some examples, the weather barrier includes a second extension spring. In some examples, the weather barrier includes a second pulley. In some examples, the weather barrier includes a second elongate member that is pliable. In some examples, the second elongate member extends through the lower portion and is connected to the inward portion. In some examples, the second elongate member is wrapped at least partially around the second pulley. In some examples, the second extension spring is coupled to the second pulley. In some examples, an adjuster is coupled to at least one of the first spring, the second spring. In some examples, the first elongate member and the second elongate member. In some examples, the adjuster is to adjust tension in at least one of the first elongate member or the second elongate member such that tension in the first elongate member is greater than tension in the second elongate member.

In some examples, the first extension spring is under greater tension than the second extension spring.

In some examples, the first extension spring extends a first delta-length in response to the side bellows expanding from the retracted position to the extended position, the inward portion of the side bellows travels a certain distance upon the side bellows expanding from the retracted position to the extended position, and the certain distance is greater than the first delta-length.

In some examples, the first extension spring has a longitudinal centerline that is angularly displaced out of parallel alignment with the lateral axis.

In some examples, the first extension spring has a longitudinal centerline that is substantially vertical.

In some examples, the first extension spring is within the side air chamber.

In some examples, the weather barrier includes a first sheave. In some examples, the first elongate member extends at least partially around the first sheave. In some examples, the first pulley to rotate about a first rotational axis in response to the side bellows expanding from the retracted position to the extended position. In some examples, the first sheave is to rotate about a second rotational axis in response to the side bellows expanding from the retracted position to the extended position. In some examples, the second rotational axis is angularly displaced out of parallel alignment with the first rotational axis.

In some examples, the weather barrier includes a first sheave. In some examples, the first elongate member extends at least partially around the first sheave. In some examples, the first pulley to rotate about a first rotational axis in response to the side bellows expanding from the retracted position to the extended position. In some examples, the first rotational axis to move in translation in response to the side bellows expanding from the retracted position to the extended position. In some examples, the first sheave to rotate about a second rotational axis in response to the side bellows expanding from the retracted position to the extended position, the second rotational axis being at a substantially fixed location as the side bellows expands form the retracted position to the extended position.

In some examples, a weather barrier is to at least partially seal or shelter a vehicle parked at a loading dock of a building. In some examples, the building having a wall facing in a forward direction generally toward the vehicle when the vehicle is parked at the loading dock. In some examples, the wall defining a doorway proximate a rear portion of the vehicle when the vehicle is parked at the loading dock, the doorway lying along a plane that is substantially coplanar with the wall. In some examples, the plane is perpendicular to a longitudinal axis that is centrally positioned within the doorway. In some examples, the longitudinal axis intersects and is perpendicular to a vertical axis. In some examples, the longitudinal axis and vertical axis interest and are perpendicular to a lateral axis that is horizontal. In some examples, the weather barrier includes an upper bellows defining a header air chamber between a top portion and a bottom portion of the upper bellows. In some examples, the top portion to be mounted at an elevation near an upper edge of the doorway. In some examples, the upper bellows is vertically expandable from a raised position to a lowered position. In some examples, the bottom portion is closer to the top portion when the upper bellows is in the raised position than when the upper bellows is in the lowered position. In some examples, the upper bellows is horizontally elongate when the upper bellows is in the raised position. In some examples, a blower in fluid communication with the header air chamber. In some examples, the blower is selectively activated to discharge a pressurized air into the header air chamber. In some examples, the pressurized air urges the upper bellows toward the lowered position. In some examples, a first extension spring has a longitudinal centerline that is angularly displaced out of parallel alignment with the vertical axis. In some examples, a first elongate member that is pliable. In some examples, the first elongate member is to couple the first extension spring to the bottom portion of the upper bellows.

In some examples, at least a portion of the first elongate member extends substantially perpendicular to the longitudinal centerline of the first extension spring.

In some examples, a tube contains the first extension spring.

In some examples, a first pulley couples the first extension spring to the first elongate member. In some examples, the first extension spring extends a first delta-length in response to the upper bellows expanding from the raised position to the lowered position, the bottom portion of the upper bellows to move a certain distance upon the upper bellows expanding from the raised position to the lowered position. In some examples, the certain distance being greater than the first delta-length.

In some examples, a weather barrier is to at least partially seal or shelter a vehicle parked at a loading dock of a building, the building having a wall facing in a forward direction generally toward the vehicle when the vehicle is parked at the loading dock, the wall defining a doorway proximate a rear portion of the vehicle when the vehicle is parked at the loading dock, the doorway lying along a plane that is substantially coplanar with the wall, the plane being perpendicular to a longitudinal axis that is centrally positioned within the doorway, the longitudinal axis intersecting and being perpendicular to a vertical axis, the longitudinal axis and vertical axis interesting and being perpendicular to a lateral axis that is horizontal. In some examples, the weather barrier includes an upper bellows defining a header air chamber between a top portion and a bottom portion of the upper bellows. In some examples, the top portion is to be mounted at an elevation near an upper edge of the doorway. In some examples, the upper bellows is vertically expandable from a raised position to a lowered position. In some examples, the bottom portion is closer to the top portion when the upper bellows is in the raised position than when the upper bellows is in the lowered position. In some examples, the upper bellows is horizontally elongate when the upper bellows is in the raised position. In some examples, the top portion has a top length extending substantially horizontally and substantially parallel to the lateral axis. In some examples, the bottom portion has a bottom length extending substantially horizontally and substantially parallel to the lateral axis. In some examples, a side bellows defines a side air chamber between an outward portion and inward portion of the side bellows. In some examples, the longitudinal axis is closer to the inward portion than to the outward portion. In some examples, the side bellows is laterally expandable from a retracted position to an extended position. In some examples, the outward portion is closer to the inward portion when the side bellows is in the retracted position than when the side bellows is in the extended position. In some examples, the side bellows is vertically elongate when the side bellows is in the retracted position. In some examples, the outward portion has an outward length extending substantially vertically and substantially parallel to the vertical axis. In some examples, the inward portion has an inward length extending substantially vertically and substantially parallel to the vertical axis. In some examples, an air transfer tube is to fluidly couple the header air chamber and the side air chamber. In some examples, the air transfer tube is proximate both the top portion of the upper bellows and the outward portion of the side bellows. In some examples, a blower is in fluid communication with the header air chamber and the side air chamber. In some examples, the blower is selectively activated to discharge a pressurized air into the header air chamber. In some examples, the pressurized air urges the upper bellows toward the lowered position and urges the side bellows toward the expanded position. In some examples, a stepped surface on at least one of the upper bellows and the side bellows. In some examples, the stepped surface rendering at least one of the following: a) the bottom length shorter than the top length, and b) the inward length shorter than the outward length.

In some examples, the stepped surface is on the upper bellows, and the bottom length is shorter than the top length.

In some examples, the stepped surface is on the side bellows, and the inward length is shorter than the outward length.

In some examples, the air transfer tube extends lengthwise substantially parallel to the longitudinal axis, and the air transfer tube is more rigid than the upper bellows and the side bellows.

In some examples, a weather barrier to at least partially seal or shelter a vehicle parked at a loading dock of a building. In some examples, the building having a wall facing in a forward direction generally toward the vehicle when the vehicle is parked at the loading dock, the wall defining a doorway proximate a rear portion of the vehicle when the vehicle is parked at the loading dock, the doorway lying along a plane that is substantially coplanar with the wall. In some examples, the plane is perpendicular to a longitudinal axis that is centrally positioned within the doorway, the longitudinal axis intersecting and being perpendicular to a vertical axis, and the longitudinal axis and vertical axis interesting and being perpendicular to a lateral axis that is horizontal. In some examples, the weather barrier includes an upper bellows defining a header air chamber between a top portion and a bottom portion of the upper bellows. In some examples, the top portion is mounted at an elevation near an upper edge of the doorway. In some examples, the upper bellows is vertically expandable from a raised position to a lowered position. In some examples, the bottom portion being closer to the top portion when the upper bellows is in the raised position than when the upper bellows is in the lowered position. In some examples, the upper bellows is horizontally elongate when the upper bellows is in the raised position. In some examples, a blower is in fluid communication with the header air chamber. In some examples, the blower is selectively activated to discharge a pressurized air into the header air chamber. In some examples, the pressurized air to urge the upper bellows toward the lowered position. In some examples, the weather barrier includes a first elongate member that is pliable. In some examples, the first elongate member is to extend upward from the bottom portion of the upper bellows. In some examples, the weather barrier includes a second elongate member that is pliable. In some examples, the second elongate member to extend upward from the bottom portion of the upper bellows. In some examples, a counterweight suspended from both the first elongate member and the second elongate member. In some examples, the counterweight is in sliding relationship with the tube. In some examples, a divider separates the first elongate member from the second elongate member in an area proximate an upper end of the tube.

In some examples, the weather barrier includes a first sheave across which the first elongate member travels, wherein the divider is between the counterweight and the first sheave; and a second sheave across which the second elongate member is to move, wherein the divider is also between the counterweight and the second sheave.

In some examples, the divider is attached to the tube.

In some examples, the divider is a horizontally elongate member attached to the tube.

In some examples, a weather barrier is to at least partially seal or shelter a vehicle parked at a loading dock of a building, the building having a wall facing in a forward direction generally toward the vehicle when the vehicle is parked at the loading dock, the wall defining a doorway proximate a rear portion of the vehicle when the vehicle is parked at the loading dock, the doorway lying along a plane that is substantially coplanar with the wall, the plane being perpendicular to a longitudinal axis that is centrally positioned within the doorway, the longitudinal axis intersecting and being perpendicular to a vertical axis, the longitudinal axis and vertical axis interesting and being perpendicular to a lateral axis that is horizontal. In some examples, the weather barrier includes an upper bellows defining a header air chamber between a top portion and a bottom portion of the upper bellows. In some examples, the top portion being mounted at an elevation near an upper edge of the doorway. In some examples, the upper bellows being vertically expandable from a raised position to a lowered position. In some examples, the bottom portion being closer to the top portion when the upper bellows is in the raised position than when the upper bellows is in the lowered position. In some examples, the upper bellows being horizontally elongate when the upper bellows is in the raised position. In some examples, a blower in fluid communication with the header air chamber. In some examples, the blower being selectively activated to discharge a pressurized air into the header air chamber. In some examples, the pressurized air urging the upper bellows toward the lowered position. In some examples, a guide rod being vertically elongate and mounted at a substantially fixed position. In some examples, a slider attached to the upper bellows proximate the bottom portion of the upper bellows. In some examples, the slider being connected in sliding relationship with the guide rod such that the slider slides along the guide rod as the upper bellows moves between the raised position and the lowered position.

In some examples, the guide rod is a metal cylinder extending between two substantially stationary anchor points, and the slider is a ring encircling the guide rod.

In some examples, the guide rod comprises a plastic sleeve on a metal cylinder, wherein the guide rod extends between two substantially stationary anchor points, and the slider is a ring encircling the guide rod.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A weather barrier to at least partially seal or shelter a vehicle parked at a loading dock of a building, the building having a wall facing in a forward direction generally toward the vehicle when the vehicle is parked at the loading dock, the wall defining a doorway proximate a rear portion of the vehicle when the vehicle is parked at the loading dock, the doorway lying along a plane that is substantially coplanar with the wall, the plane being perpendicular to a longitudinal axis that is centrally positioned within the doorway, the longitudinal axis intersecting and being perpendicular to a vertical axis, the longitudinal axis and vertical axis interesting and being perpendicular to a lateral axis that is horizontal, the weather barrier comprising:

an upper bellows defining a header air chamber between a top portion and a bottom portion of the upper bellows, the top portion being mounted at an elevation near an upper edge of the doorway, the upper bellows being vertically expandable from a raised position to a lowered position, the bottom portion being closer to the top portion when the upper bellows is in the raised position than when the upper bellows is in the lowered position, the upper bellows being horizontally elongate when the upper bellows is in the raised position;

a blower in fluid communication with the header air chamber, the blower being selectively activated to discharge a pressurized air into the header air chamber, the pressurized air urging the upper bellows toward the lowered position;

a first extension spring under a first extension spring tension;

a first pulley; and a first elongate member that is pliable, the first elongate member being under a first elongate member tension that urges the upper bellows toward the raised position, the first elongate member being connected to the bottom portion of the upper bellows, the first elongate member being wrapped at least partially around the first pulley, the first extension spring being connected to the first pulley, the first pulley to transmit the first extension spring tension to the first elongate member to subject the first elongate member to the first elongate member tension, the first extension spring tension being appreciably greater than the first elongate member tension.

2. The weather barrier of claim 1, wherein the first extension spring extends a first delta-length in response to the upper bellows expanding from the raised position to the lowered position, the bottom portion of the upper bellows to move a certain distance upon the upper bellows expanding from the raised position to the lowered position, and the certain distance is greater than the first delta-length.

3. The weather barrier of claim 1, wherein the first extension spring has a longitudinal centerline that is angularly displaced out of parallel alignment with the vertical axis.

4. The weather barrier of claim 3, wherein the longitudinal centerline of the first extension spring is substantially horizontal.

5. The weather barrier of claim 1, wherein the first extension spring is within the header air chamber.

6. A weather barrier to at least partially seal or shelter a vehicle parked at a loading dock of a building, the weather barrier comprising:

an upper bellows defining a header air chamber between a top portion and a bottom portion of the upper bellows, the top portion to be mounted at an elevation near an upper edge of the doorway, the upper bellows being vertically expandable from a raised position to a lowered position, the bottom portion being closer to the top portion when the upper bellows is in the raised position than when the upper bellows is in the lowered position;

a blower in fluid communication with the header air chamber, the blower being selectively activated to discharge a pressurized air into the header air chamber, the pressurized air urging the upper bellows toward the lowered position;

a first extension spring;

a first pulley; and a first elongate member that is pliable, the first elongate member being connected to the bottom portion of the upper bellows, the first elongate member being wrapped at least partially around the first pulley, the first extension spring being coupled to the first pulley, the first extension spring extending a first delta-length in response to the upper bellows expanding from the raised position to the lowered position, the bottom portion of the upper bellows to move a certain distance upon the upper bellows expanding from the raised position to the lowered position, and the certain distance being greater than the first delta-length.

7. The weather barrier of claim 6, wherein the first extension spring has a longitudinal centerline that is angularly displaced out of parallel alignment with a vertical axis that is perpendicular to and intersecting a longitudinal axis of the doorway, wherein the longitudinal axis is perpendicular to a plane that is coplanar with the wall.

8. The weather barrier of claim 6, wherein the first extension spring has a longitudinal centerline that is substantially horizontal.

9. The weather barrier of claim 6, wherein the first extension spring is within the header air chamber.

10. The weather barrier of claim 6, further comprising a first sheave, the first elongate member extending at least partially around the first sheave, the first pulley rotating about a first rotational axis in response to the upper bellows expanding from the raised position to the lowered position, the first sheave rotating about a second rotational axis in response to the upper bellows expanding from the raised position to the lowered position, the second rotational axis being angularly displaced out of parallel alignment with the first rotational axis.

11. The weather barrier of claim 6, further comprising a first sheave, the first elongate member extending at least partially around the first sheave, the first pulley rotating about a first rotational axis in response to the upper bellows expanding from the raised position to the lowered position, the first rotational axis traveling in translation in response to the upper bellows expanding from the raised position to the lowered position, the first sheave rotating about a second rotational axis in response to the upper bellows expanding from the raised position to the lowered position, the second rotational axis being at a substantially fixed location as the upper bellows expands form the raised position to the lowered position.

12. A weather barrier to at least partially seal or shelter a vehicle parked at a loading dock of a building, wherein the building has a wall facing in a forward direction generally toward the vehicle when the vehicle is parked at the loading dock, the wall defining a doorway proximate a rear portion of the vehicle when the vehicle is parked at the loading dock, the doorway lying along a plane that is substantially coplanar with the wall, the plane being perpendicular to a longitudinal axis that is centrally positioned within the doorway, the longitudinal axis intersecting and being perpendicular to a vertical axis, the longitudinal axis and vertical axis interesting and being perpendicular to a lateral axis that is horizontal, the weather barrier comprising:
- a side bellows defining a side air chamber between an outward portion and inward portion of the side bellows, the longitudinal axis being closer to the inward portion than to the outward portion, the side bellows being laterally expandable from a retracted position to an extended position, the outward portion being closer to the inward portion when the side bellows is in the retracted position than when the side bellows is in the extended position, the side bellows being vertically elongate when the side bellows is in the retracted position;
- a blower in fluid communication with the side air chamber, the blower being selectively activated to discharge a pressurized air into the side air chamber, the pressurized air urging the side bellows toward the extended position;
- a first extension spring;
- a first pulley; and
- a first elongate member that is pliable, the first elongate member being connected to the inward portion of the side bellows, the first elongate member being wrapped at least partially around the first pulley, the first extension spring being coupled to the first pulley, the first extension spring extending a first delta-length in response to the side bellows expanding from the retracted position to the extended position, the inward portion of the side bellows to move a certain distance upon the side bellows expanding from the retracted position to the extended position, and the certain distance being greater than the first delta-length.

13. The weather barrier of claim 12, wherein the first extension spring has a longitudinal centerline that is angularly displaced out of parallel alignment with the lateral axis.

14. The weather barrier of claim 12, wherein the first extension spring has a longitudinal centerline that is substantially vertical.

15. The weather barrier of claim 12, wherein the first extension spring is within the side air chamber.

16. The weather barrier of claim 12, further comprising a first sheave, the first elongate member extending at least partially around the first sheave, the first pulley rotating about a first rotational axis in response to the side bellows expanding from the retracted position to the extended position, the first sheave rotating about a second rotational axis in response to the side bellows expanding from the retracted position to the extended position, the second rotational axis being angularly displaced out of parallel alignment with the first rotational axis.

17. The weather barrier of claim 12, further comprising a first sheave, the first elongate member extending at least partially around the first sheave, the first pulley rotating about a first rotational axis in response to the side bellows expanding from the retracted position to the extended position, the first rotational axis traveling in translation in response to the side bellows expanding from the retracted position to the extended position, the first sheave rotating about a second rotational axis in response to the side bellows expanding from the retracted position to the extended position, the second rotational axis being at a substantially fixed location as the side bellows expands form the retracted position to the extended position.

18. The weather barrier of claim 12, further comprising an adjuster coupled to at least one of the first spring and the first elongate member, the adjuster having selectively a tighter configuration and a looser configuration, the first elongate member being in greater tension when the adjuster is in the tighter configuration while the side bellows is in the extended position than when the adjuster is in the looser configuration while the side bellows is in the extended position.

19. A weather barrier to at least partially seal or shelter a vehicle parked at a loading dock of a building, the building having a wall facing in a forward direction generally toward the vehicle when the vehicle is parked at the loading dock, the wall defining a doorway proximate a rear portion of the vehicle when the vehicle is parked at the loading dock, the doorway lying along a plane that is substantially coplanar with the wall, the plane being perpendicular to a longitudinal axis that is centrally positioned within the doorway, the longitudinal axis intersecting and being perpendicular to a vertical axis, the longitudinal axis and vertical axis interesting and being perpendicular to a lateral axis that is horizontal, the weather barrier comprising:

an upper bellows defining a header air chamber between a top portion and a bottom portion of the upper bellows, the top portion to be mounted at an elevation near an upper edge of the doorway, the upper bellows being vertically expandable from a raised position to a lowered position, the bottom portion being closer to the top portion when the upper bellows is in the raised position than when the upper bellows is in the lowered position, the upper bellows being horizontally elongate when the upper bellows is in the raised position;

a blower in fluid communication with the header air chamber, the blower being selectively activated to discharge a pressurized air into the header air chamber, the pressurized air urging the upper bellows toward the lowered position;

a first extension spring having a longitudinal centerline that is angularly displaced out of parallel alignment with the vertical axis; and a first elongate member that is pliable, the first elongate member to couple the first extension spring to the bottom portion of the upper bellows.

20. The weather barrier of claim 19, wherein at least a portion of the first elongate member extends substantially perpendicular to the longitudinal centerline of the first extension spring.

21. The weather barrier of claim 19, further comprising a tube containing the first extension spring.

22. The weather barrier of claim 19, further comprising a first pulley coupling the first extension spring to the first elongate member, the first extension spring extending a first delta-length in response to the upper bellows expanding from the raised position to the lowered position, the bottom portion of the upper bellows to move a certain distance upon the upper bellows expanding from the raised position to the lowered position, and the certain distance being greater than the first delta-length.

* * * * *

UNITED STATES PATENT AND TRADEMARK OFFICE
CERTIFICATE OF CORRECTION

PATENT NO.        : 9,969,576 B1
APPLICATION NO.   : 15/439587
DATED             : May 15, 2018
INVENTOR(S)       : Charles J. Ashelin et al.

Page 1 of 1

It is certified that error appears in the above-identified patent and that said Letters Patent is hereby corrected as shown below:

In the Claims

Column 19, Lines 65-66 (Claim 1): Replace "interesting" with "intersecting" after "vertical axis" and before "and being perpendicular to"

Column 21, Line 15 (Claim 7): Replace "the" with "a" between "coplanar with" and "wall."

Column 21, Lines 54-55 (Claim 12): Replace "interesting" with "intersecting" after "vertical axis" and before "and being perpendicular to"

Column 23, Lines 3-4 (Claim 19): Replace "interesting" with "intersecting" after "vertical axis" and before "and being perpendicular to"

Signed and Sealed this
Thirteenth Day of November, 2018

Andrei Iancu
*Director of the United States Patent and Trademark Office*